US010068338B2

(12) United States Patent
Atanassov et al.

(10) Patent No.: US 10,068,338 B2
(45) Date of Patent: Sep. 4, 2018

(54) ACTIVE SENSING SPATIAL RESOLUTION IMPROVEMENT THROUGH MULTIPLE RECEIVERS AND CODE REUSE

(71) Applicant: QUALCOMM Incorporated, San Diego, CA (US)

(72) Inventors: Kalin Mitkov Atanassov, San Diego, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 14/645,923

(22) Filed: Mar. 12, 2015

(65) Prior Publication Data

US 2016/0267671 A1     Sep. 15, 2016

(51) Int. Cl.
*G06K 9/20* (2006.01)
*G06K 9/62* (2006.01)
(Continued)

(52) U.S. Cl.
CPC .......... *G06T 7/0075* (2013.01); *G06K 9/2027* (2013.01); *G06K 9/6201* (2013.01);
(Continued)

(58) Field of Classification Search
CPC ................ G06K 9/2027; G06K 9/6201; G06T 2207/10021; G06T 2207/10028;
(Continued)

(56) References Cited

U.S. PATENT DOCUMENTS 4,653,104 A    3/1987  Tamura
6,229,913 B1   5/2001  Nayar et al.
(Continued)

FOREIGN PATENT DOCUMENTS

CN    102831582 A    12/2012
CN    103796004 A     5/2014
(Continued)

OTHER PUBLICATIONS

Tsalakanidou et al., "Real-time Acquisition of Depth and Color Images using Structured Light and its Application to 3D Face Recognition," Real-Time Imaging, Academic Press Limited, GB, vol. 11, No. 5-6, Oct. 1, 2005 (Oct. 1, 2005), pp. 358-369, XP005074682.

(Continued)

*Primary Examiner* — Deirdre Beasley
(74) *Attorney, Agent, or Firm* — Knobbe, Martens, Olson & Bear, LLP

(57) ABSTRACT

Structured light active sensing systems transmit and receive spatial codes to generate depth maps. Spatial codes can't be repeated within a disparity range if they are to be uniquely identified. This results in large numbers of codes for single transmitter/single receiver systems, because reflected ray traces from two object locations may be focused onto the same location of the receiver sensor, making it impossible to determine which object location reflected the code. However, the original code location may be uniquely identified because ray traces from the two object locations that focus onto the same location of the first receiver sensor may focus onto different locations on the second receiver sensor. Described herein are active sensing systems and methods that use two receivers to uniquely identify original code positions and allow for greater code reuse.

28 Claims, 14 Drawing Sheets

(51) Int. Cl.
*G06T 7/00* (2017.01)
*H04N 13/02* (2006.01)
*H04N 5/247* (2006.01)
*H04N 13/204* (2018.01)
*H04N 13/271* (2018.01)
*G06T 7/521* (2017.01)

(52) U.S. Cl.
CPC ............ *G06T 7/521* (2017.01); *H04N 5/247* (2013.01); *H04N 13/204* (2018.05); *H04N 13/271* (2018.05); *G06T 2207/10021* (2013.01); *G06T 2207/10028* (2013.01)

(58) Field of Classification Search
CPC ... G06T 7/0075; G06T 7/521; H04N 13/0203; H04N 13/0271; H04N 5/247
USPC .......................................................... 348/47
See application file for complete search history.

(56) References Cited

U.S. PATENT DOCUMENTS

| | | | |
|---|---|---|---|
| 7,212,663 B2 | 5/2007 | Tomasi | |
| 7,440,590 B1* | 10/2008 | Hassebrook | G01B 11/2513 345/582 |
| 7,894,525 B2 | 2/2011 | Piehl et al. | |
| 7,916,932 B2 | 3/2011 | Lee et al. | |
| 8,531,535 B2 | 9/2013 | Kwatra et al. | |
| 8,724,854 B2 | 5/2014 | Jin et al. | |
| 8,806,305 B2 | 8/2014 | Przybylski | |
| 9,638,801 B2* | 5/2017 | Boufounos | G01S 17/89 |
| 2004/0151365 A1* | 8/2004 | An Chang | G06K 9/2036 382/154 |
| 2005/0018209 A1 | 1/2005 | Lemelin et al. | |
| 2005/0229069 A1 | 10/2005 | Hassner et al. | |
| 2006/0098212 A1* | 5/2006 | Forster | G01B 11/2518 356/604 |
| 2008/0128501 A1* | 6/2008 | Thebault | G06K 7/10 235/454 |
| 2008/0130016 A1 | 6/2008 | Steinbichler et al. | |
| 2008/0205748 A1* | 8/2008 | Lee | G01B 11/25 382/154 |
| 2009/0022367 A1* | 1/2009 | Sasaki | G01B 11/25 382/103 |
| 2009/0310822 A1 | 12/2009 | Chang et al. | |
| 2009/0322859 A1 | 12/2009 | Shelton et al. | |
| 2010/0074532 A1* | 3/2010 | Gordon | G01B 11/25 382/203 |
| 2010/0180176 A1 | 7/2010 | Yosoku et al. | |
| 2011/0096832 A1 | 4/2011 | Zhang et al. | |
| 2011/0147620 A1* | 6/2011 | Arai | B23K 26/082 250/492.1 |
| 2012/0019836 A1* | 1/2012 | Honma | G01B 11/2522 356/603 |
| 2012/0056874 A1 | 3/2012 | Kim et al. | |
| 2012/0056982 A1 | 3/2012 | Katz et al. | |
| 2012/0086803 A1 | 4/2012 | Malzbender et al. | |
| 2012/0229609 A1 | 9/2012 | Yamada et al. | |
| 2012/0242795 A1* | 9/2012 | Kane | G01B 11/2513 348/46 |
| 2012/0294510 A1* | 11/2012 | Zhang | G06K 9/2036 382/154 |
| 2013/0038694 A1 | 2/2013 | Nichani et al. | |
| 2013/0050426 A1 | 2/2013 | Sarmast et al. | |
| 2013/0128121 A1 | 5/2013 | Agarwala et al. | |
| 2013/0141544 A1 | 6/2013 | Tsuyuki | |
| 2013/0162629 A1 | 6/2013 | Huang et al. | |
| 2013/0293684 A1 | 11/2013 | Becker et al. | |
| 2013/0301908 A1* | 11/2013 | Shim | G06T 5/005 382/154 |
| 2013/0314696 A1* | 11/2013 | Atanassov | G06T 5/001 356/51 |
| 2013/0315354 A1 | 11/2013 | Atanassov et al. | |
| 2013/0315501 A1 | 11/2013 | Atanassov et al. | |
| 2013/0342671 A1 | 12/2013 | Hummel et al. | |
| 2014/0002610 A1* | 1/2014 | Xi | G01B 11/2513 348/46 |
| 2014/0118539 A1* | 5/2014 | Ota | G01C 3/08 348/140 |
| 2014/0132721 A1 | 5/2014 | Martinez et al. | |
| 2014/0132722 A1* | 5/2014 | Martinez Bauza | G01B 11/25 348/46 |
| 2014/0160309 A1 | 6/2014 | Karpenko | |
| 2014/0168362 A1 | 6/2014 | Hannuksela et al. | |
| 2014/0192154 A1 | 7/2014 | Jeong et al. | |
| 2014/0219549 A1* | 8/2014 | Choi | G06T 7/593 382/154 |
| 2014/0223256 A1 | 8/2014 | Sakai et al. | |
| 2014/0240318 A1 | 8/2014 | Coombe et al. | |
| 2014/0241614 A1 | 8/2014 | Lee | |
| 2014/0380115 A1 | 12/2014 | Bar-On | |
| 2015/0110347 A1* | 4/2015 | Suzuki | G06K 9/00355 382/103 |
| 2015/0117514 A1 | 4/2015 | Choi et al. | |
| 2015/0178592 A1 | 6/2015 | Ratcliff et al. | |
| 2015/0193938 A1 | 7/2015 | Freedman et al. | |
| 2015/0221093 A1* | 8/2015 | Sagawa | G01B 11/2513 345/419 |
| 2015/0229911 A1* | 8/2015 | Ge | H04N 13/0239 348/47 |
| 2015/0310620 A1* | 10/2015 | Aviv | G06T 7/521 382/154 |
| 2015/0381972 A1* | 12/2015 | Kowdle | H04N 9/3191 348/51 |
| 2016/0050372 A1 | 2/2016 | Lindner | |
| 2016/0063309 A1* | 3/2016 | Konolige | G06K 9/00201 382/153 |
| 2016/0146595 A1* | 5/2016 | Boufounos | G01S 17/89 348/47 |
| 2016/0202050 A1* | 7/2016 | Lee | G01B 11/2513 356/610 |
| 2016/0255332 A1 | 9/2016 | Nash et al. | |
| 2016/0275690 A1 | 9/2016 | Siddiqui et al. | |
| 2017/0048507 A1 | 2/2017 | Campbell et al. | |
| 2017/0061634 A1 | 3/2017 | Nash et al. | |
| 2018/0068456 A1 | 3/2018 | Nash et al. | |

FOREIGN PATENT DOCUMENTS

| | | |
|---|---|---|
| JP | 2012141252 A | 7/2012 |
| KR | 20140088309 A | 7/2014 |
| WO | WO-9210830 A1 | 6/1992 |
| WO | WO-0181859 A1 | 11/2001 |
| WO | WO-2013068548 A2 | 5/2013 |
| WO | WO-2013074510 A1 | 5/2013 |
| WO | WO-2015152829 A1 | 10/2015 |
| WO | WO-2016137753 | 9/2016 |

OTHER PUBLICATIONS

Wijenayake U., et al., "An Error Correcting 3D Scanning Technique Using Dual Pseudorandom Arrays," 3D Imaging, Modeling, Processing, Visualization and Transmission (3DIMPVT), 2012 Second International Conference on, IEEE, Oct. 13, 2012 (Oct. 13, 2012), pp. 517-523, XP032277316.

Wijenayake U., et al., "Dual Pseudorandom Array Technique for Error Correction and Hole Filling of Color Structured-light three-dimensional Scanning," Optical Engineering., vol. 54(4), Apr. 27, 2015 (Apr. 27, 2015), p. 043109, XP055309719.

Buyukyazi T., et al., "Real-time Image Stabilization and Mosaicking by Using Ground Station CPU in UAV surveillance", 2013 6th International Conference on Recent Advances in Space Technologies (RAST), IEEE, Jun. 12, 2013 (Jun. 12, 2013), pp. 121-126, XP032477136, DOI : 10. 1109/RAST .2013.6581183 ISBN : 978-1-4673-6395-2.

Hong W., et al., "Video Stabilization and Rolling Shutter Distortion Reduction", 2010 17th IEEE International Conference on Image Processing (ICIP 2010), Sep. 26-29, 2010, Hong Kong, China, IEEE, Piscataway, NJ, USA, Sep. 26, 2010 (Sep. 26, 2010), pp. 3501-3504, XP031811299, ISBN: 978-1-4244-7992-4.

(56) References Cited

OTHER PUBLICATIONS

Lindner A., et al., "Depth Enhanced and Content Aware Video Stabilization", Proceedings of SPIE, vol. 9411, Mar. 11, 2015 (Mar. 11, 2015), pp. 941106-1 to 941106-6, XP055229514, US ISSN: 0277-786X, DOI: 10.1117/12.2083443 ISBN: 978-1-62841-839-2.
Yahyanejad S., et al., "Incremental, Orthorectified and Loop-independent Mosaicking of Aerial Images taken by Micro UAVs", Robotic and Sensors Environments (ROSE), 2011 IEEE International Symposium on, IEEE, Sep. 17, 2011 (Sep. 17, 2011), pp. 137-142, XP031961274, DOI: 10.1109/ROSE.2011.6058531 ISBN: 978-1-4577-0819-0.
International Search Report and Written Opinion—PCT/US2016/019147—ISA/EPO—dated Jun. 8, 2016.
Zhang J., et al., "Robust Human Tracking Algorithm Applied for Occlusion Handling", Frontier of Computer Science and Technology (FCST), 2010 Fifth International Conference on, IEEE, Piscataway, NJ, USA, Aug. 18, 2010 (Aug. 18, 2010), pp. 546-551, XP031755281.

\* cited by examiner

ACTIVE SENSING SPATIAL RESOLUTION IMPROVEMENT THROUGH MULTIPLE RECEIVERS AND CODE REUSE

FIELD

This application relates to systems and methods to improve spatial code reuse and spatial resolution in active sensing systems with more than one receiver.

BACKGROUND

Structured light active sensing systems transmit and receive spatial codes to generate a depth map. The farther away an object is from the transmitter and receiver, the closer the received projection is from its original position at the receiver(s), as the outgoing projection and incoming projection are more parallel. Conversely, the closer an object is to the transmitter and receiver, the farther the received projection is from its original position at the receiver(s). Thus, the difference between received and transmitted codeword position gives the depth of the scene or object. Structured light active sensing systems use these relative depths to generate a depth map or a three dimensional representation of a scene. Depth map extraction is critical to many applications ranging from camera quality enhancement to computer vision.

Each code within an expected disparity range, ranging from the received location for the minimum distance of an object to a maximum distance of an object in a field of view, needs to be unique so that the reflected codes can be distinguished from each other. As long as the code is not repeated within the disparity range, a code may be repeated without causing ambiguity because the original code positions may be uniquely identified. Codes may be comprised of symbols, such as binary symbols. As the number of codes increase, the number of symbols for each code increases, the bandwidth per symbol increases, the space required to display each symbol increases, and the resolution of the depth mask decreases. Therefore, there is a need to reduce the number of unique codes required by making it possible to repeat codes more frequently within each frame.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages of increasing codeword reuse without introducing codeword ambiguity.

One innovation includes an imaging apparatus for generating depth information for at least one object in a scene. The apparatus may include a transmitter configured to project a codemask comprising spatial codes. The apparatus may include a first receiver positioned at a first distance from the transmitter. The first receiver may be configured to capture a first image that includes spatial codes reflected from an object in a scene illuminated by the codemask. The apparatus may include a second receiver positioned at a second distance from the transmitter. The second receiver may be configured to capture a second image that includes spatial codes reflected from the object. The apparatus may include at least one processor in communication with the first receiver and the second receiver. The at least one processor may be configured to obtain the first image, obtain the second image, match a first spatial code that exists in the first image and in the second image to spatial codes in the codemask, and determine depth information of the object based on the matched spatial codes.

For some embodiments, the codemask includes at least two sets of spatial codes that are unique within each set, and at least two of the at least two or more sets of spatial codes are identical. For some embodiments, the codemask includes at least two sets of spatial codes, the spatial codes within each set of spatial codes being unique, and at least two of the at least two sets of spatial codes contain at least a portion of the same spatial codes.

For some embodiments, the at least one processor is further configured to match the first spatial code to a set of spatial codes in the codemask, each spatial code in the set being associated with a location in the codemask and the first spatial code being associated with a location in the first image and a location in the second image. For some embodiments, the at least one processor is further configured to determine a first difference between the location in the codemask of the first spatial code and the location of the first spatial code in the first image. For some embodiments, the at least one processor is further configured to determine a second difference between the location in the codemask of the first spatial code and the location of the first spatial code in the second image, the first difference and the second difference each corresponding to a depth of the object. For some embodiments, the processor is further configured to determine depth information of the object based on the first and second differences.

For some embodiments, the at least one processor is further configured to identify a first set of candidate codemask locations in the projected codemask corresponding to one of the identified spatial codes in the first image. For some embodiments, the at least one processor is further configured to identify a second set of candidate codemask locations in the projected codemask corresponding to one of the identified spatial codes in the first image. For some embodiments, the at least one processor is further configured to select a codemask location based on the first and second sets of candidate codemask locations. For some embodiments, the at least one processor is further configured to determine a difference in location between the codemask location and the location of the one of identified spatial codes in the first image or the second image. For some embodiments, the at least one processor is further configured to determine depth information of the at least one object based on the difference in location.

For some embodiments, the selected codemask location is within a distance tolerance of a candidate codemask location in the first set and within the distance tolerance of a candidate codemask location in the second set. For some embodiments, the at least one processor is further configured to determine a first set of differences in the location of a plurality of spatial codes in the projected codemask and the location of said plurality of spatial codes in the first image. For some embodiments, the at least one processor is further configured to determine a second set of differences in the location of a plurality of spatial codes in the projected codemask and the location of said plurality of spatial codes in the second image. For some embodiments, the at least one processor is further configured to determine depth information of the at least one object based on the determined first and second sets of differences of the plurality of spatial codes.

For some embodiments, the second sensor is positioned closer to the first sensor than to the transmitter. For some embodiments, the first sensor is between the second sensor and the transmitter. For some embodiments, the first distance and the second distance are different. For some embodiments, the at least one processor is further configured to obtain the codemask.

Another innovation is a method for generating a depth map. The method may include projecting a codemask in a projected field-of-view from a transmitter. The method may further include receiving at a first receiver, positioned at a first distance from the transmitter, a first image including a first reflection of the projected codemask from the surface of at least one object illuminated by the codemask. The method may further include receiving at a second receiver, positioned at a second distance from the transmitter, a second image including a second reflection of the projected codemask from the surface of the at least one object. The method may include identifying spatial codes in the first and second images. The method may include determining depth information of the at least one object based on the identified spatial codes in both of the first and second images, For some embodiments, the method may include identifying a set of candidate codemask locations in the projected codemask corresponding to one of the identified spatial codes in the first image. For some embodiments, the method may include selecting a codemask location from the set of candidate codemask locations, the selected codemask location corresponding to the one of the identified spatial codes in the second image. For some embodiments, the method may include determining a difference in location between the codemask location and the location of the one of identified spatial codes in the first image or the second image. For some embodiments, the method may include determining depth information of the at least one object based on the difference in location.

For some embodiments, the method may include identifying a first set of candidate codemask locations in the projected codemask corresponding to one of the identified spatial codes in the first image. For some embodiments, the method may include identifying a second set of candidate codemask locations in the projected codemask corresponding to one of the identified spatial codes in the first image. For some embodiments, the method may include selecting a codemask location based on the first and second sets of candidate codemask locations. For some embodiments, the method may include determining a difference in location between the codemask location and the location of the one of identified spatial codes in the first image or the second image. For some embodiments, the method may include determining depth information of the at least one object based on the difference in location.

For some embodiments, the method further includes determining a first set of differences in the location of a plurality of spatial codes in the projected codemask and the location of said plurality of spatial codes in the first image. For some embodiments, the method further includes determining a second set of differences in the location of a plurality of spatial codes in the projected codemask and the location of said plurality of spatial codes in the second images. For some embodiments, the method further includes determining depth information of the at least one object based on the said determined first and second sets of differences of the plurality of spatial codes.

Another innovation is an apparatus for generating depth map information for at least one object in a scene. The apparatus may include means for projecting a codemask in a projected field-of-view of the means for projecting. The apparatus may include a first means for receiving, positioned at a first distance from the means for projecting, a first image including a first reflection of the projected codemask from the surface of at least one object illuminated by the codemask. The apparatus may include a second means for receiving, positioned at a second distance from the projecting, a second image including a second reflection of the projected codemask from the surface of the at least one object. The apparatus may include means for identifying spatial codes that are in both of the first image and the second image. The apparatus may include means for determining depth information of the at least one object based on the identified spatial codes.

For some embodiments, the means for projecting includes a transmitter. For some embodiments, the first means for receiving includes a first receiver. For some embodiments the second means for receiving includes a second receiver. For some embodiments, the identifying means includes at least one processor. For some embodiments, the determining means includes at least one processor.

For some embodiments, the apparatus may further include means for identifying a set of candidate codemask locations in the projected codemask corresponding to one of the identified spatial codes in the first image. For some embodiments, the apparatus may further include means for selecting a codemask location from the set of candidate codemask locations, the selected codemask location corresponding to the one of the identified spatial codes in the second image. For some embodiments, the apparatus may further include means for determining a difference in location between the codemask location and the location of the one of identified spatial codes in the first image or the second image. For some embodiments, the apparatus may further include means for determining depth information of the at least one object based on the difference in location.

For some embodiments, the apparatus may include means for identifying a second set of candidate codemask locations in the projected codemask corresponding to one of the identified spatial codes in the first image. For some embodiments, the apparatus may include means for selecting a codemask location based on the first and second sets of candidate codemask locations. For some embodiments, the apparatus may include means for determining a difference in location between the codemask location and the location of the one of identified spatial codes in the first image or the second image. For some embodiments, the apparatus may include means for determining depth information of the at least one object based on the difference in location.

For some embodiments, the selected codemask location is within a distance tolerance of a candidate codemask location in the first set and within the distance tolerance of a candidate codemask location in the second set.

For some embodiments, the apparatus further includes means for determining a first set of differences in the location of a plurality of spatial codes in the projected codemask and the location of said plurality of spatial codes in the first image. For some embodiments, the apparatus further includes means for determining a second set of differences in the location of a plurality of spatial codes in the projected codemask and the location of said plurality of spatial codes in the second image. For some embodiments, the apparatus further includes means for determining depth information of the at least one object based on the said determined first and second sets of differences of the plurality of spatial codes.

Another innovation is a non-transitory computer-readable medium storing instructions for generating depth information, the instructions when executed perform a process. The process may include projecting a codemask in a projected field-of-view from a transmitter. The process may include capturing a first image by a first receiver positioned at a first distance from the transmitter, a first image. The process may include capturing a second image at a second receiver positioned at a second distance from the transmitter, the first and second images depicting at least a portion of the projected codemask that is reflected from a surface of at least one object. The process may include identifying spatial codes in the first image and the second image. The process may include determining depth information of the at least one object based on the identified spatial codes that are in both the first and second images.

For some implementations, the process may further include identifying a set of candidate codemask locations in the projected codemask corresponding to one of the identified spatial codes in the first image. For some implementations, the process may further include selecting a codemask location from the set of candidate codemask locations, the selected codemask location corresponding to the one of the identified spatial codes in the second image. For some implementations, the process may further include determining a difference in location between the selected codemask location and the location of the one of the identified spatial codes in the first image or the second image. For some implementations, the process may further include determining depth information of the at least one object based on the difference in location.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION OF CERTAIN EMBODIMENTS

Figure 1:
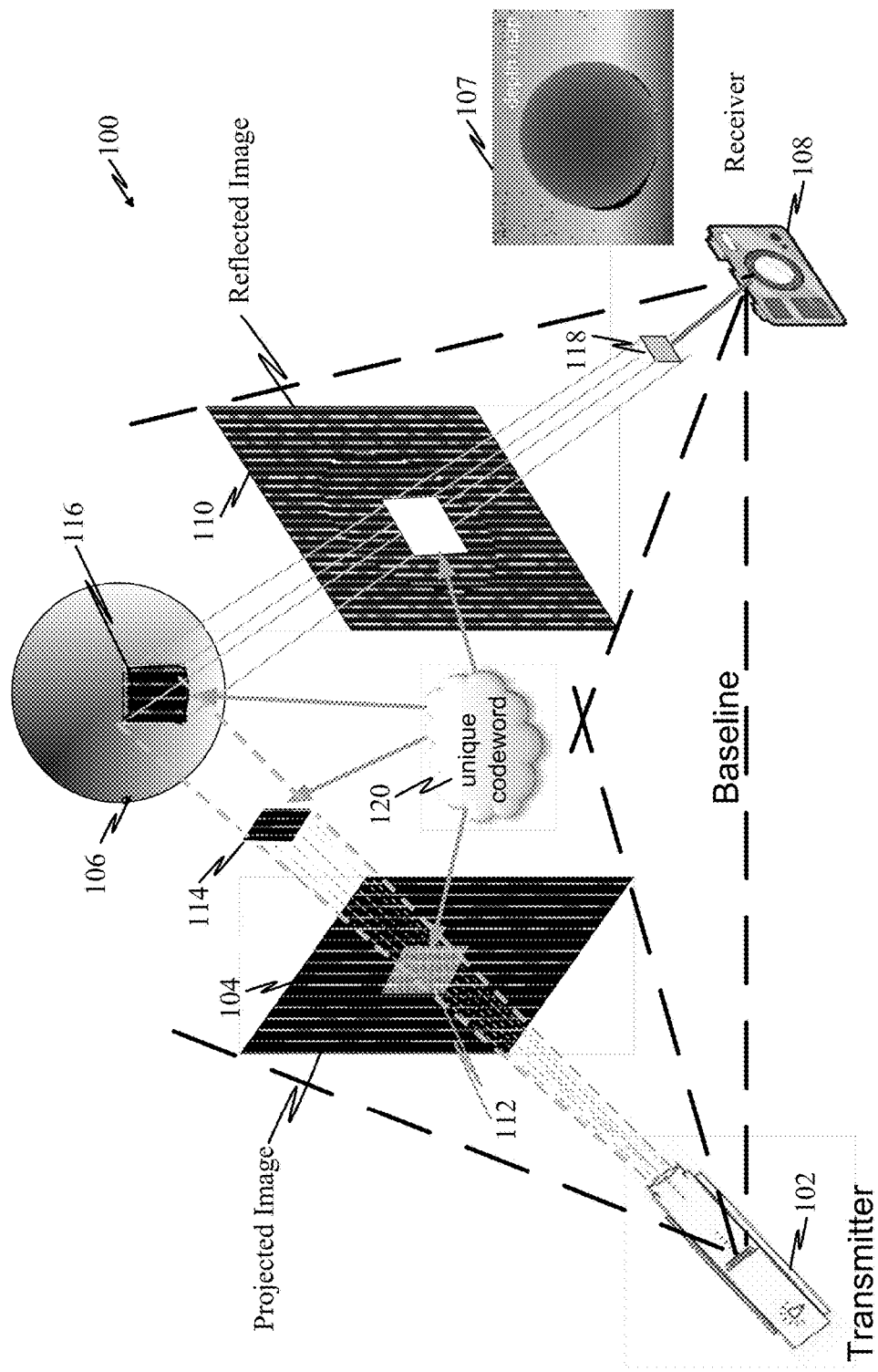
FIG. 1 illustrates an exemplary active sensing system where a known pattern is used to illuminate a scene or object and obtain depth information to generate 3-dimensional information from 2-dimensional images and/or information.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The systems and methods described herein may be implemented on a variety of different computing devices that hosts an active spatial sensing system. These include dedicated imaging systems, mobile phones, tablets, dedicated cameras, wearable computers, personal computers, photo booths or kiosks, personal digital assistants, ultra-mobile personal computers, and mobile internet devices. They may use general purpose or special purpose computing system environments or configurations. Examples of computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Structured light active sensing systems transmit and receive spatial codes to generate a depth map. Spatial codes may be comprised of symbols, such as binary symbols. As the number of spatial codes increases, the number of symbols for each spatial code increases, the bandwidth per symbol increases, the space required to display each symbol increases, and the resolution of the depth mask decreases. As spatial code size increases spatially, the resolution of the depth mask decreases. Therefore, there is a need to reduce the number of unique spatial codes that are used by making it possible to repeat codes more frequently within each frame.

Transmitted rays of a projection of codes from a transmitter to an object are more parallel to received (incoming) codes reflected off of the surface of an object illuminated by the transmitted rays as the distance between the transmitter/receiver and the object increases. Accordingly, codes reflected from an object and received by a receiver, or receivers, are closer to their original position (in the projected code image) when the object is farther away. Conversely, the closer an object is to the transmitter and receiver, the farther the received codes are from the original position of the codes (in the projected code image) when they were transmitted. The difference between received and transmitted codeword positions can be used to determine one or more depths of a scene or an object. Structured light active sensing systems may use such depth information to generate a depth map or a three dimensional representation of a scene. Depth map generation of a scene or an object may be important to many applications ranging from camera quality enhancement to computer vision.

Structured light active sensing systems estimate depth for objects within the field of view of both a transmitter and a receiver, over distances ranging from a minimum object distance to a maximum object distance. The difference $\delta$ between the location of a codeword in a transmitted image, and the location of the same codeword in a received image is at a minimum ($\delta_{min}$) for objects located at a maximum object distance from the transmitter/receiver. Conversely, the difference $\delta$ between codeword positions in a received image and a transmitted image is at a maximum ($\delta_{max}$) for objects that are located at a minimum object distance from the transmitter/receiver. Therefore, the range from $\delta_{min}$ to $\delta_{max}$ may represent a "disparity" range, e.g., in pixels, that corresponds to the range of physical object distances from the transmitter/receiver.

Because received codes are closer to the original position for more distant objects, $\delta_{min}$, the minimum distance between the received codes and the original position occurs for objects that are at the maximum distance from the receiver and transmitter. Similarly, $\delta_{max}$, the maximum distance between the received codes and the original position occurs for objects that are at the minimum distance from the receiver and transmitter. The range of distance $\delta_{min}$ to $\delta_{max}$ corresponds to a disparity range. To determine the distance between a received code and an original position of the code, structured light sensing systems first determine the position of the original position of a code that corresponds to a received projection. If each code is unique, there is a one-to-one mapping from the reflected code to the original position. However, this approach does not allow for reuse of codes, resulting in too many codes for many applications.

A first approach to reducing the number of codes may take advantage of the disparity range. Codes may be reused as long as they are not used again within an expected disparity range. This enables a reduction in the number of codes used. While this may reduce the number of codes significantly, each code within an expected disparity range is unique, that is, none of the codes within an expected disparity range are identical, so that the original positions may be identified for each code within a disparity range. As long as the code is not repeated within the disparity range, a code may be repeated (or reused) without causing ambiguity because the original code positions may be uniquely identified.

For a system with one transmitter and one receiver at a first distance d1 from the transmitter, the number of unique codes may be reduced by reusing codes based on the expected disparity range. However, if a code is reused within the disparity range, it cannot be unambiguously identified because reflected ray traces from two object locations may be focused onto the same location of the first receiver sensor, making it impossible to determine which object location projected the code. As a result, more information is needed to determine the depth associated with the received code.

However, the original position of a code may be determined, and the ray trace uniquely identified, in a system that includes a second receiver. Another term sometimes used herein to generally refer to a process of determining an original position of a code, and identifying corresponding ray traces, is "disambiguate." In systems with two receivers, the ray traces from the two indeterminate object locations as sensed by a first receiver are focused onto different locations on the second receiver sensor. Accordingly, using a second receiver enables code reuse within the disparity range.

Exemplary Operating Environment

FIG. 1 illustrates an exemplary active sensing system 100 that illuminates a scene or object with a known pattern to obtain depth information to generate 3D information from 2D images and/or information. One or more aspects and/or features described herein may be implemented in sensing system 100. The sensing system 100 includes a transmitter 102 that is configured to project a light field through a code mask 104 (e.g., image with codes) to project codewords on an object 106 (or a scene). A receiver 108 captures the projected code mask 110 and codewords therein. This example illustrates how a section/portion/window 112 of the code mask 104 is projected (as section/portion/window 114) onto the surface (e.g., projected section/portion/window 116) of the object 106. The projected section/portion/window 116 may then be captured by the receiver 108 as a captured segment 118. The section/portion/window 112 may be used as a codeword that can be uniquely identified. By illuminating the object 106 with unique codewords in this manner, sections/portions of the object 106 may be identified/tagged and this information may be used for depth sensing. For some implementations, more than one receiver 108 receives reflective codewords from the object 106. For example, an implementation with two receivers 108, the receivers at different distances from the transmitter 102, may uniquely identify the original position of codes (disambiguate codes) that are reused within the disparity range.

From the image captured by the receiver 108, multiple segments may be identified over the object 106. Each segment 118 may be uniquely identifiable at the receiver 108 and its location relative to other segments ascertained from the known pattern of the coded mask 104. The identification of a code from each segment/portion/window may involve pattern segmentation (e.g., to address distortion) and decoding of the perceived segment/portion/window into a corresponding code(s). Additionally, triangulation may be applied over each captured segment/portion/window to ascertain an orientation and/or depth. Multiple such segments/portions/windows may be combined to stitch together a captured image pattern. In this manner, a map of depth may be generated for the scene or object 106.

Figure 2:
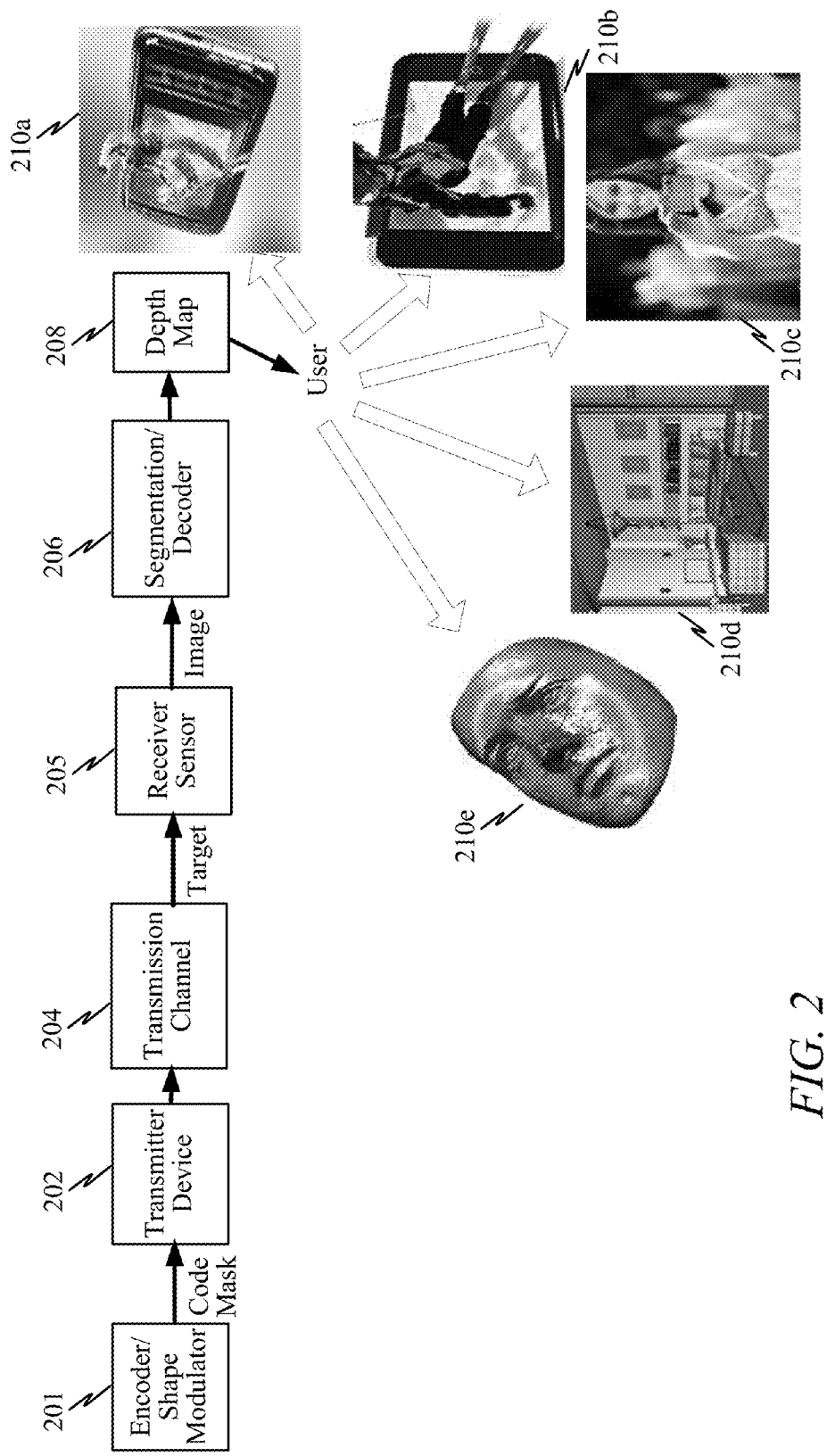
FIG. 2 is a schematic that illustrates another exemplary system for active sensing where a three-dimensional (3D) scene is constructed from two-dimensional (2D) images or information.

FIG. 2 illustrates another exemplary system for active sensing where a 3-dimensional (3D) scene is constructed from 2-dimensional (2D) images or information. An encoder/shape modulator 201 may serve to generate a code mask which is then projected by a transmitter device 202 over a transmission channel 204. The code mask may be projected onto a target (e.g., a scene or object) and the reflected light is captured by at least one receiver sensor 205 as an image (e.g., code mask image). At the at least one receiver sensor 205 (e.g., receiver(s) 108 in FIG. 1), the target (e.g., scene or object) is captured and its shape/depth is encoded 205. Shape/depth encoding may be achieved, for example, using the projected code mask to ascertain the depth information. For instance, the captured image of the scene or object (which includes the projected code mask) may be decoded 206 to obtain a depth map 208. The depth map 208 may then be used to present, generate, and/or provide a 3-dimensional version 210*a-e* of the target.

Active sensing relies on being able to recognize (at the receiver sensor 205 and/or decoder 206) spatial codes (e.g., codewords) from the code mask being projected by the transmitter device 202 on a scene or object. If a scene or object is too close to transmitter/receiver, the surface of the scene or object is angled/curved, and/or a baseline reference plane is tilted, the codes become modified under unknown affine transformation (e.g., rotation, skew, compression, elongation, etc.).

One or more aspects or features described herein may be included within the exemplary environments of FIGS. 1 and 2.

Exemplary Active Depth Sensing

Figure 3:
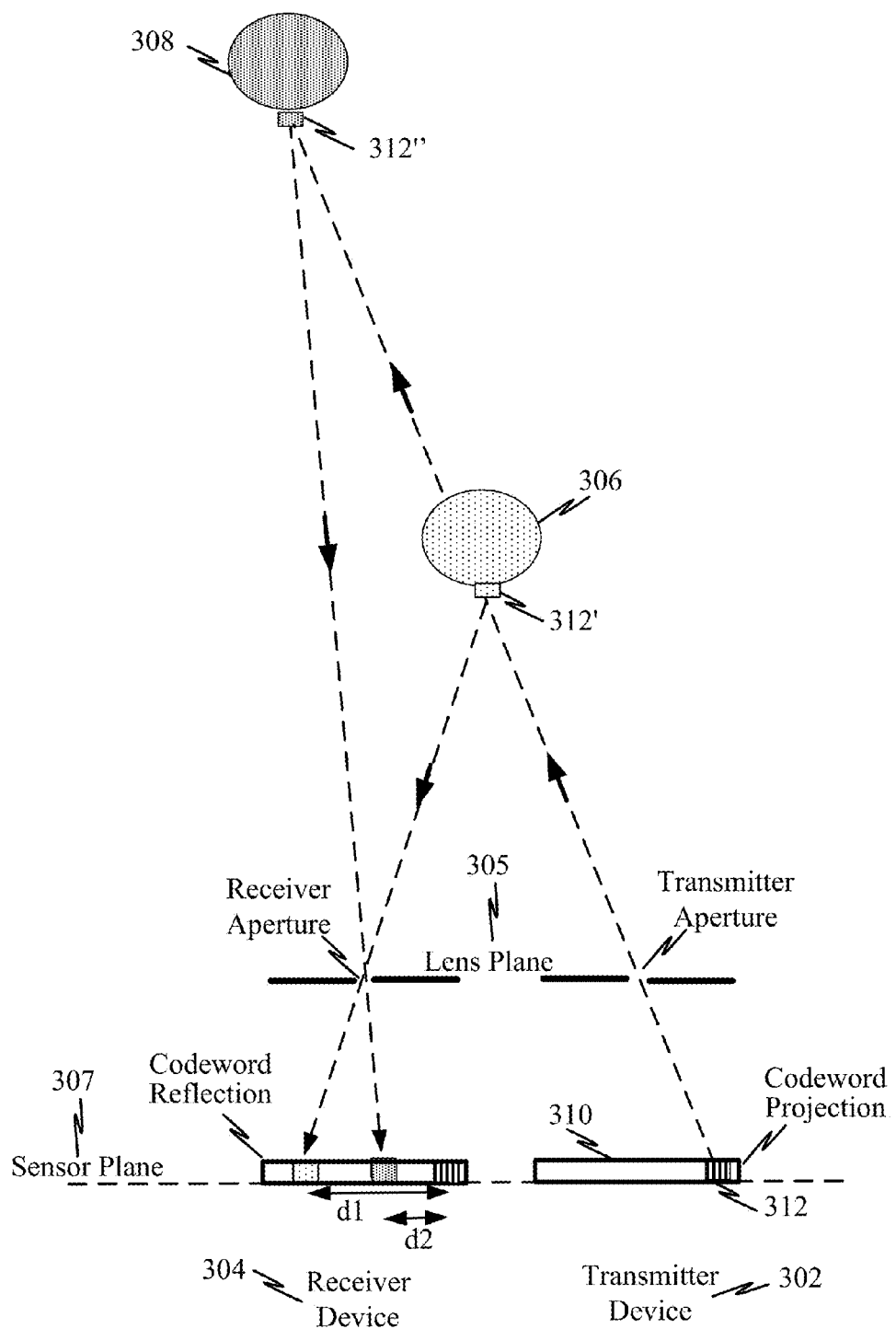
FIG. 3 is a schematic that illustrates an example of how depth may be sensed for an object or scene.

FIG. 3 illustrates how depth may be sensed for an object or scene. Here, a transmitter device 302 is on the same baseline reference plane (e.g., lens plane 305) as the receiver device 304. The transmitter device 302 projects a code mask 310 onto a scene or object through an aperture or lens. For purposes of illustration, a projected segment/portion/window 312 (representing a codeword) is shown as part of the transmitted code mask 310. This code segment/portion/window 312 may be projected on a scene or object 306 at a first distance or at a second distance. Each receiver device 304 captures the projected code mask 310 (as a received code mask 311) through a receiver aperture. Here, the transmitted code mask 310 is shown on the same sensor plane 307 as the received code mask 311. It can be appreciated that when the scene or object 306 is located closer to the transmitter device 302 (e.g., a first distance from the transmitter device) the projected segment 312 appears at a distance d1 from its initial location. When the scene or object 308 is located farther away (e.g., a second distance from the transmitter device), the projected segment/portion/window 312 appears at a distance d2 from its initial location (where d2<d1). That is, the farther away an object is from the transmitter/receiver, the closer the received projected segment/portion/window is from its original position at the receiver device 304 (for example, the outgoing projection and incoming projection are more parallel). Conversely, the closer an object is from the transmitter/receiver, the farther the received projected segment/portion/window is from its original position at the receiver device 304. The difference between received and transmitted codeword position gives the depth of the scene or object. In one example, such depth (for example, relative depth) may provide a depth for each pixel or subset of grouped pixels (for example, regions of two or more pixels).

Figure 7:
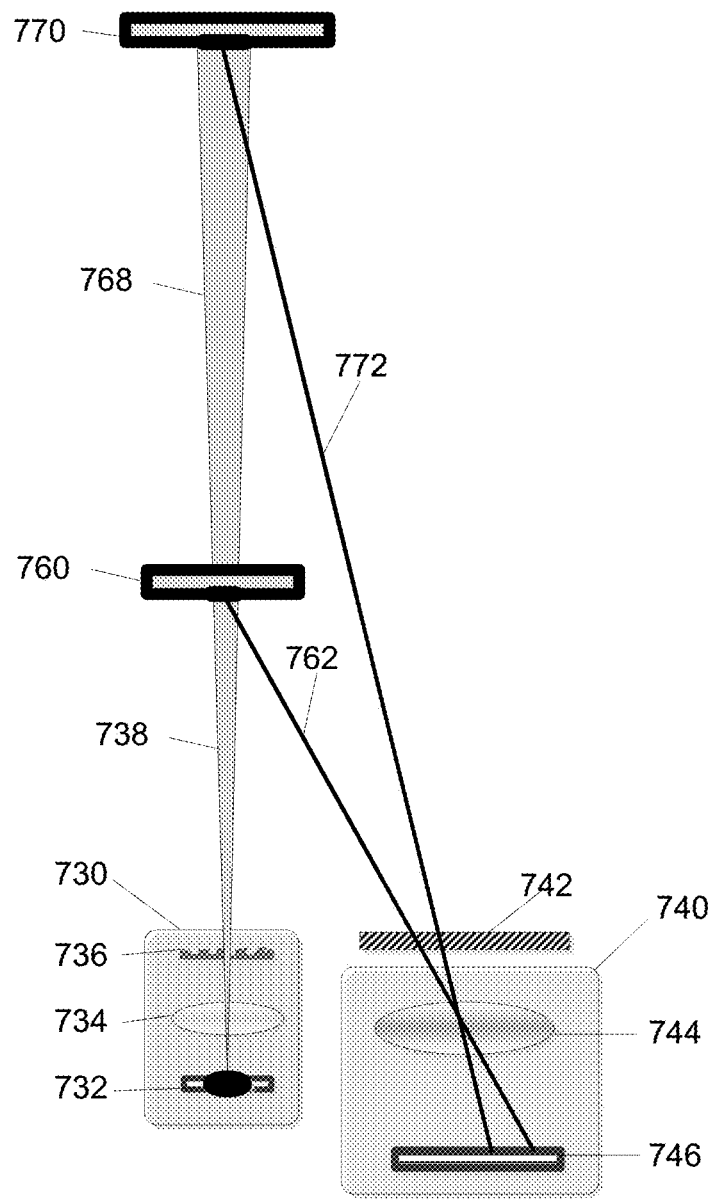
FIG. 7 illustrates an exemplary active sensing system with one transmitter and one receiver, with ray traces for two object locations for which original code positions can be uniquely identified with one receiver.
Figure 8:
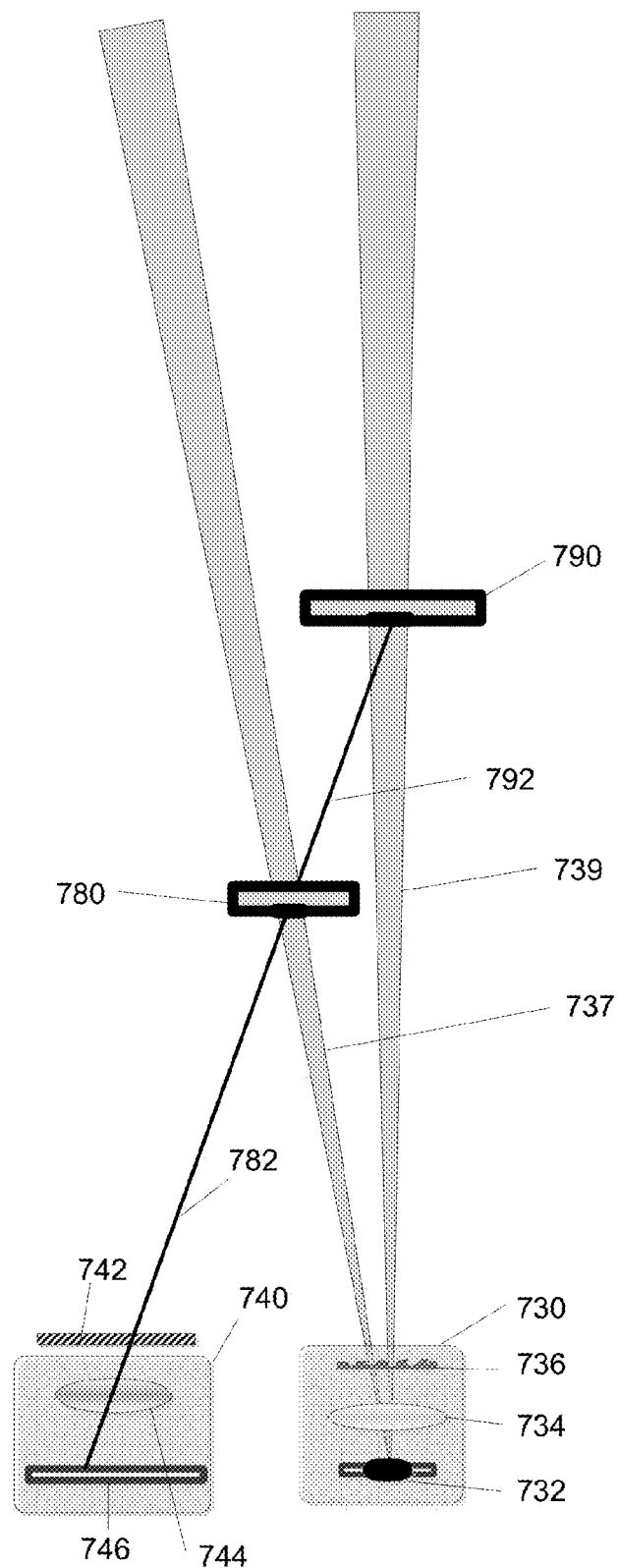
FIG. 8 illustrates the exemplary active sensing system of FIG. 7, with ray traces for two object locations for which original code positions cannot be uniquely identified with one receiver.
Figure 9:
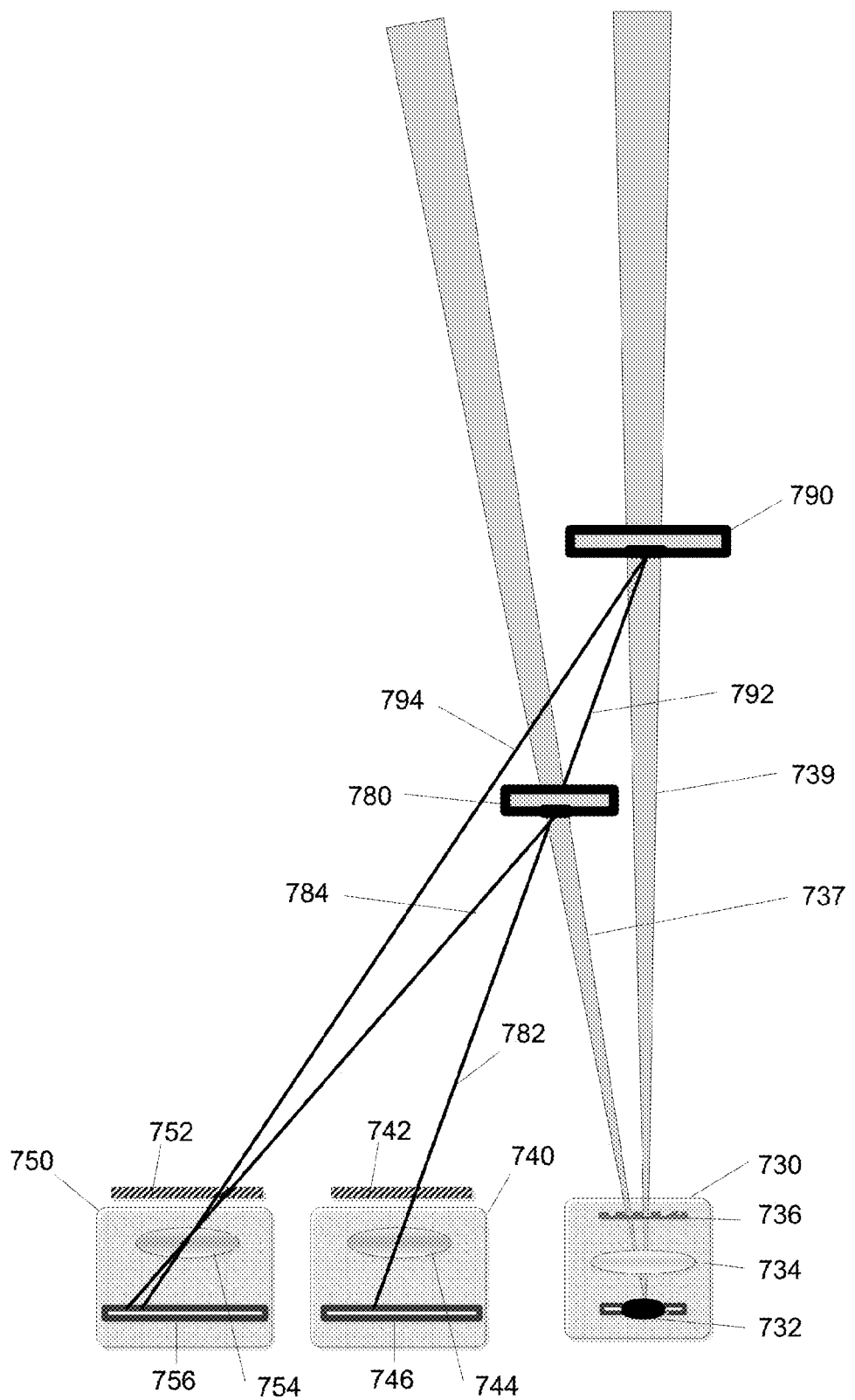
FIG. 9 illustrates an exemplary active sensing system with one transmitter and two receivers, with ray traces for the two object locations of FIG. 8, for which original code positions can be uniquely identified with the introduction of the second receiver.

FIGS. 7-9 illustrate certain problems that are addressed by an active sensing system having two receivers. For example, FIG. 7 illustrates a system that includes transmitter 730 and receiver 740. The transmitter 730 projects codes 738 and 768 onto objects 760 and 770, respectively. Object 760 reflects ray 762, and object 770 reflects ray 772, to receiver 740. The receiver 740 focuses received rays 762 and 772 onto sensor 746 at two different positions. However, as illustrated in FIG. 8, if a code is repeated in projections 737 and 739, ray traces 782 and 792 reflected from objects 780 and 790, respectively, are focused by lens 744 onto the same point of sensor 746. If ray traces 782 and 792 are the same code, repeated within the disparity range that includes objects 780 and 790, then additional information would be needed to uniquely identify the original position of these two codes. For some implementations, a plurality of receiver devices 304, each at a different location, may receive projections from the scene or object. For example, FIG. 9 illustrates an implementation with one transmitter 730 and two receivers, 740 and 750. While the ray traces 782 and 792 from objects 780 and 790, respectively, are focused on to the same point of sensor 746 in receiver 740, the ray traces 784 and 794 reflected from objects 780 and 790, respectively, are focused onto different locations in image sensor 754. Therefore, while it is not possible to uniquely identify the original positions for the two projections 737 and 739 on mask 736 using one receiver 740, it is possible to identify the original positions for the two projections 737 and 739 on mask 736 because of the different focus positions on sensor 756 of receiver 754. FIGS. 7, 8, and 9 will be further described in detail below in the "Reuse of Codebook Primitives" section.

Exemplary Transmitter Device

Figure 4:
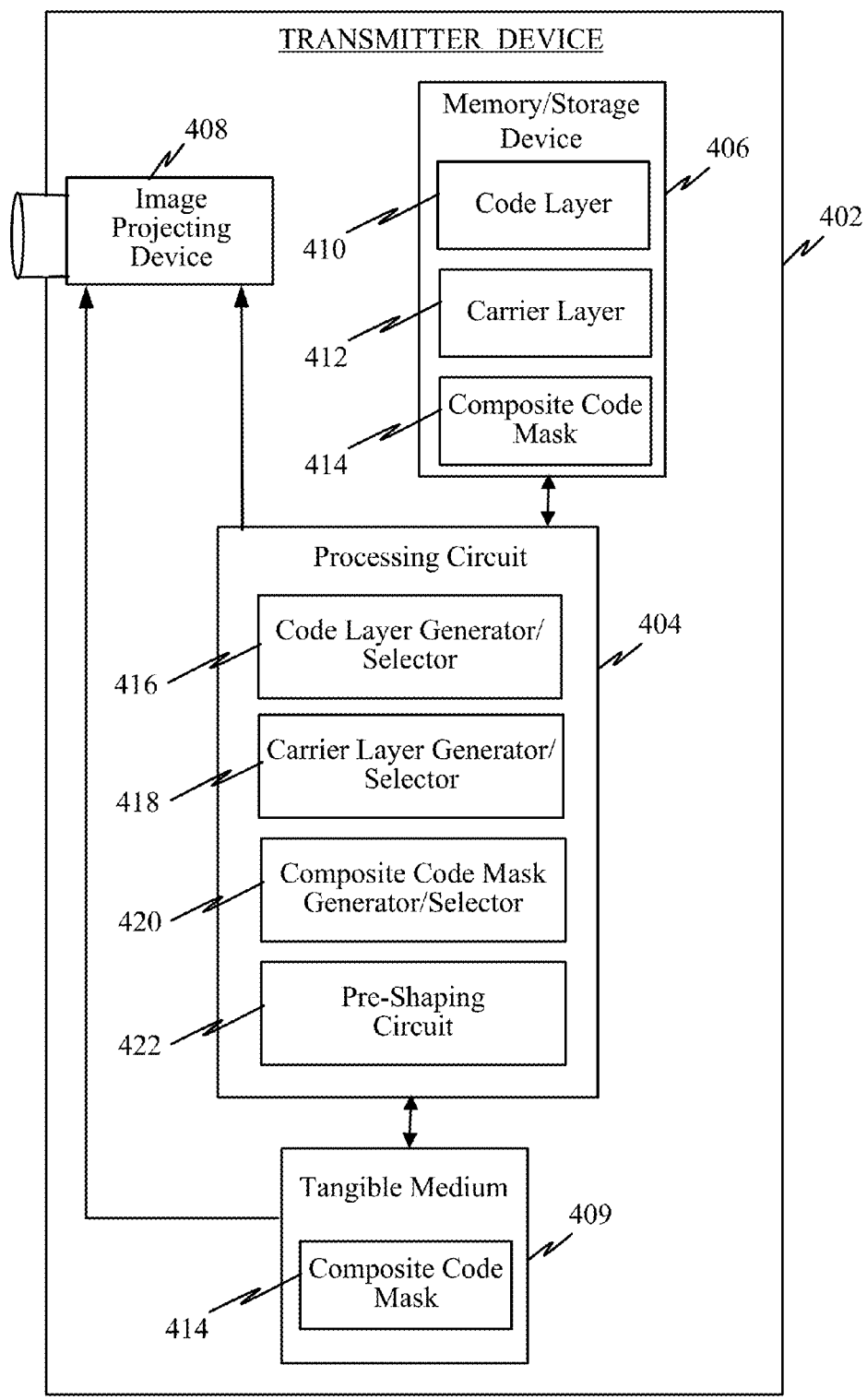
FIG. 4 is a block diagram that illustrates an example of a transmitter device that may be configured to generate a composite code mask and/or project such composite code mask.

FIG. 4 is a block diagram illustrating an example of a transmitter device that may be configured to generate a composite code mask and/or project such composite code mask. The transmitter device 402 may include a processing circuit 404 coupled to a memory/storage device 406, an image projecting device 408, and/or a tangible medium 409. Transmitter device 402 may correspond to transmitter 102 illustrated in FIG. 1, transmitter device 202 illustrated in FIG. 2, transmitter device 302 illustrated in FIG. 3, transmitter 730 illustrated in FIGS. 7-10, and/or the projecting means 1402 illustrated in FIG. 14.

In a first example, the transmitter device 402 may be coupled or include a tangible medium 409. The tangible medium may define, include, and/or store a composite code mask 414, the composite code mask including a code layer combined with a carrier layer. The code layer may include uniquely identifiable spatially-coded codewords defined by a plurality of symbols. The carrier layer may be independently ascertainable and distinct from the code layer and includes a plurality of reference objects that are robust to distortion upon projection. At least one of the code layer and carrier layer may be pre-shaped by a synthetic point spread function prior to projection.

In a second example, the processing unit 404 may include a code layer generator/selector 416, a carrier layer generator/selector 418, a composite code mask generator/selector 420 and/or a pre-shaping circuit 422. The code layer generator/selector 416 may select a pre-stored code layer 410 and/or may generate such code layer. The carrier layer generator/selector 418 may select a pre-stored carrier layer 412 and/or may generate such carrier layer. The composite code mask generator/selector may select a pre-stored composite code mask 414 and/or may combine the code layer 410 and carrier layer 412 to generate the composite code mask 414. Optionally, the processing circuit 404 may include a pre-shaping circuit that pre-shapes the composite code mask 414, the code layer 410, and/or the carrier layer 412, to compensate for expected distortion in the channel through which the composite code mask is to be projected.

In some implementations, a plurality of different code layers and/or carrier layers may be available, where each such carrier or code layers may be configured for different conditions (e.g., for objects at different distances, or different configurations between the transmitter device and receiver device). For instance, for objects within a first distance or range, a different combination of code and carrier layers may be used than for objects at a second distance or range, where the second distance is greater than the first distance. In another example, different combination of code and carrier layers may be used depending on the relative orientation of the transmitter device and receiver device.

The image projecting device 408 may serve to project the generated/selected composite code mask onto an object of interest. For instance, a laser to other light source may be used to project the composite code mask onto the object of interest (e.g., through a projection channel). In one example, the composite code mask 414 may be projected in an infrared spectrum, so it may not be visible to the naked eye. Instead, a receiver sensor in the infrared spectrum range may be used to capture such projected composite code mask.

Exemplary Receiver Device Operation

Figure 5:
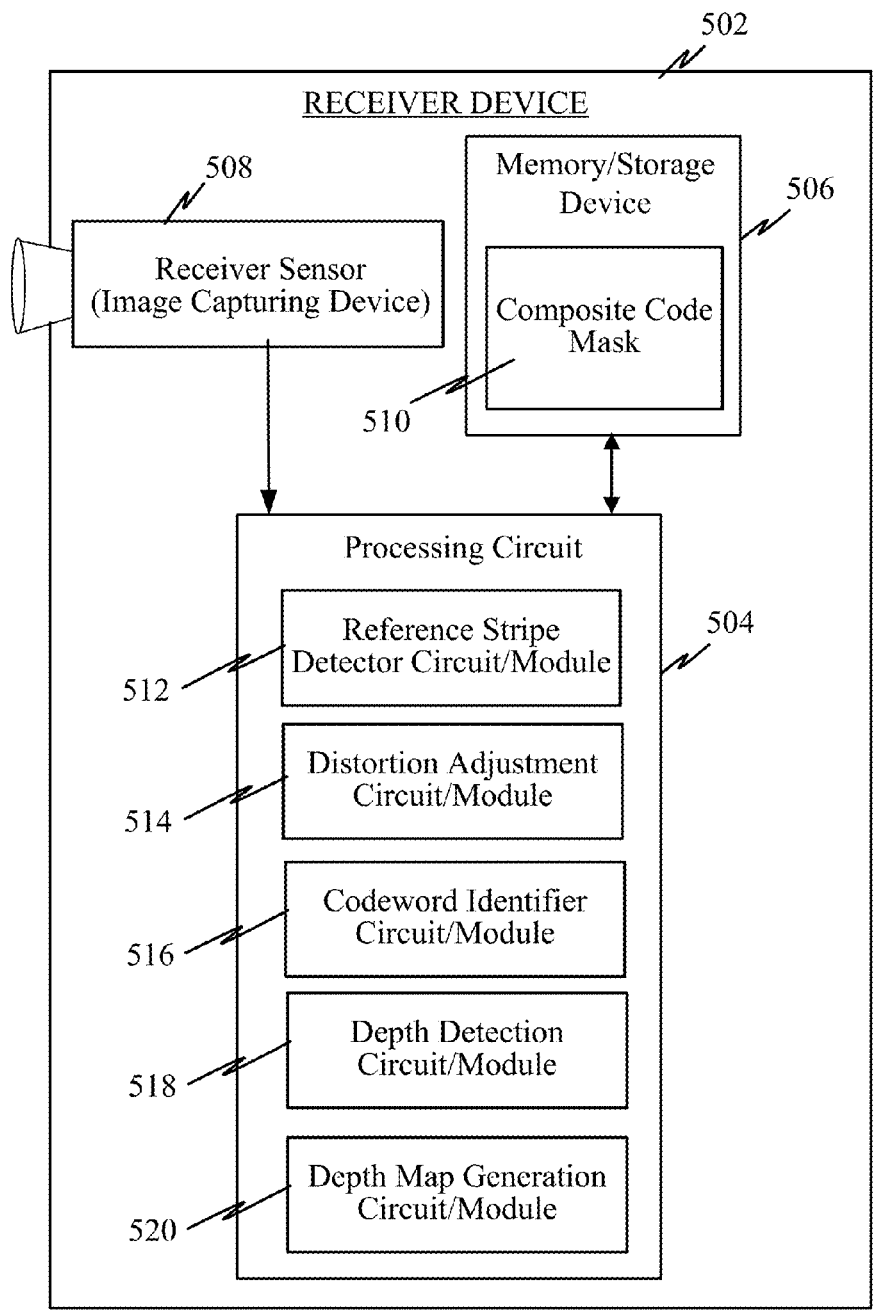
FIG. 5 is a block diagram illustrating an example of a receiver device that may be configured to obtain depth information from a composite code mask.

FIG. 5 is a block diagram illustrating an example of a receiver device that may be configured to obtain depth information from a composite code mask. The receiver device 502 may include a processing circuit 504 coupled to a memory/storage device 506 and a receiver sensor 508 (e.g., an image capturing device 508). Receiver device 502 may correspond to receiver 108 illustrated in FIG. 1, receiver device 304 illustrated in FIG. 3, receiver 740 illustrated in FIGS. 7-10, and/or receiver 750 illustrated in FIGS. 9 and 10. Receiver sensor 508 may correspond to receiver sensor 205 illustrated in FIG. 2, first distance receiver means 1404 illustrated in FIG. 14, and/or second distance receiver means illustrated in FIG. 14.

For implementations with two or more receivers, the memory/storage device 506 may store data from the two or more receivers. For implementations with two or more receivers, the processing circuit 504 may process images captured by the two or more receivers.

The receiver sensor 508 (e.g., camera, etc.) may serve to obtain at least a portion of a composite code mask projected on the surface of an object. For instance, the receiver sensor may capture at least a portion of a composite code mask projected on the surface of a target object. The composite code mask may be defined by: (a) a code layer of uniquely identifiable spatially-coded codewords defined by a plurality of symbols, and (b) a carrier layer independently ascertainable and distinct from the code layer and including a plurality of reference objects that are robust to distortion upon projection. At least one of the code layer and carrier layer may have been pre-shaped by a synthetic point spread function prior to projection. In one example, the receiver sensor 508 may capture the composite code mask in the infrared spectrum.

The code layer may comprise n1 by n2 binary symbols, where n1 and n2 are integers greater than two. In the composite code mask, each symbol may be a line segment in one of two gray-scale shades distinct from the reference objects. The symbols of the code layer may be staggered in at least one dimension. The carrier layer reference objects may comprise a plurality of equally spaced reference stripes with a guard interval in between. The reference stripes and the guard interval may be of different widths. The width of each reference stripe relative to a guard interval width may be determined by an expected optical spreading of a transmitter device and/or a receiver device.

The processing circuit 504 may include a reference stripe detector circuit/module 512, a distortion adjustment circuit/module 514, a codeword identifier circuit/module 516, a depth detection circuit/module 518, and/or a depth map generation circuit/module 520.

The reference stripe detector circuit/module 512 may be configured to detect reference stripes within the portion of the composite code mask. The distortion adjustment circuit/module 514 may be configured to adjust a distortion of the portion of the composite code mask based on an expected orientation of the reference stripes relative to an actual orientation of the reference stripes. The codeword identifier circuit/module 516 may be configured to obtain a codeword from a window defined within the portion of the composite code mask. The depth detection circuit/module 518 may be configured to obtain depth information for a surface portion of the target object corresponding to the window based on: (a) a single projection of the composite code mask, and (b) a displacement of the window relative to a known reference code mask.

The depth map generation circuit/module 520 may be configured to assemble, or generate, a depth map for the object based on a plurality of codewords detected as different overlapping windows within the portion of the undistorted composite code mask.

Reuse of Codebook Primitives

Another innovation provides an efficient way to design a code mask by reusing a codebook primitive to generate a code mask. A codebook primitive may include a plurality of spatially-coded and unique codewords within an n1 by n2 symbol structure. This codebook primitive (e.g., n1 by n2 symbol structure) may be repeated multiple times in one or more directions of the code mask. Repeating the codebook primitive permits reducing the codebook size which is desirable since that it reduces the number of comparisons that are needed to identify a particular codeword match.

Figure 6:
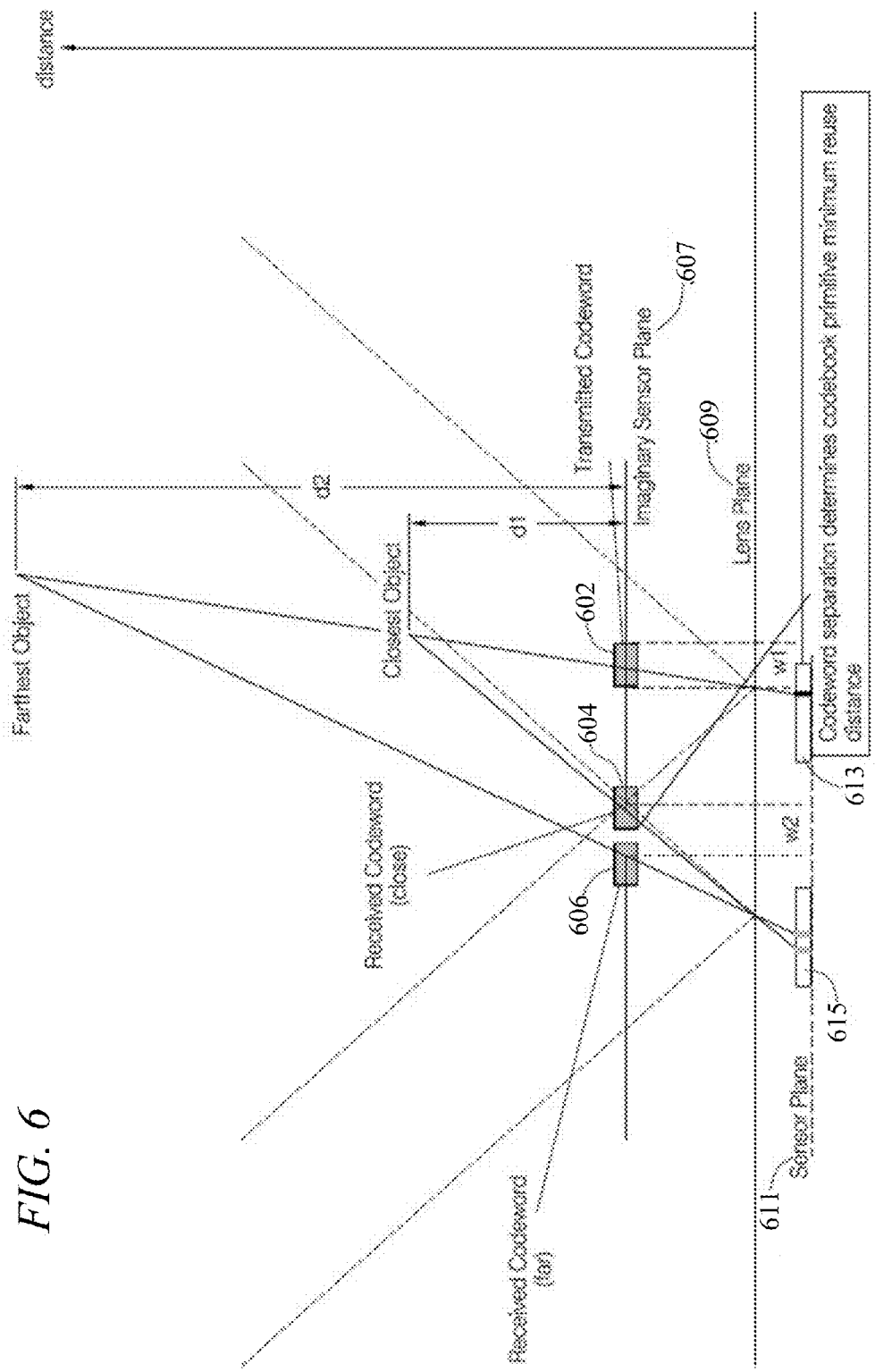
FIG. 6 illustrates an example of how codeword separation dictates a codebook primitive reuse distance.

FIG. 6 illustrates how codeword separation relates to codebook primitive reuse distance. The maximum disparity (e.g., shift of codeword) may be determined by the operating regime (e.g., nearest range to furthest range). Here, a transmitted codeword 602 may be projected upon a scene/object within a minimum range d1 and maximum range d2. The projected codeword 602 reflects on the scene/object and is captured by a receiving device. The displacement of the captured codeword 604/606 relative to the original location of the transmitted codeword 602 may be used to ascertain depth. Here, the minimum range d1 and maximum range d2 have been defined from an imaginary (e.g., arbitrary) sensor plane 607 to the closest and farthest object. However, the minimum and maximum ranges may be defined from different reference planes, like a lens plane 609 or a sensor plane 611 for the transmitter 613 and receiver 615. In the case where the minimum/maximum ranges are defined from the sensor plane 611, the maximum codeword disparity (e.g., shift of codeword) may be ascertained from the transmitted code mask and received code mask.

FIG. 7 illustrates an exemplary active sensing system with one transmitter 730 and one receiver 740, with ray traces for two object locations for which original code positions can be uniquely identified with one receiver 740. FIG. 7 illustrates ray traces for a first object 760 at a first location and a second object 770 at a second location that is farther away from the receiver 740 and the transmitter 730 than the first object 760. FIG. 7 further illustrates how the first object 760 and the second object 770, positioned at their illustrated locations, may receive and reflect light signals (illustrated by the ray traces) that can be distinguished by the receiver 740.

The transmitter 730 includes laser 732, a lens component 734 positioned to receive the laser 732 output, and a mask 736. In some embodiments the mask 736 may include a microstructure pattern. In operation, the laser 732 projects light through the lens component 734. Light exiting the lens 734 propagates through the mask 736 and projects a codeword pattern onto, for example, the first object 760 and the second object 770. In some embodiments, mask 736 may incorporate refractive optical elements. In some embodiments, mask 736 may include diffractive optical elements. Diffractive optical elements use thin micro structure patterns to alter the phase of light propagated through it. This phase pattern can manipulate the light to incorporate a desired intensity profile, including a desired codeword. Diffractive optical elements may be fabricated using photolithography techniques The surface relief profile of diffractive optical element mask 736 may use two or more surface levels, each surface structure may be etched in fused silica or other glass material, or embossed with a polymer. This surface profile results in a far field diffraction pattern corresponding to the codeword mask.

The transmitter 730 projects ray 738 onto first object 760 and/or second object 770. If the first object 760 is present, first object 760 receives ray 738, which it reflects as ray 762. If the first object 760 is not present, but the second object 770 is present, then the second object receives ray 768, which it reflects as ray 772.

The receiver 740 may have a near infrared filter 742 positioned in front of a lens component 744 that focuses filtered light onto a sensor 746.

In operation, the receiver 740 may filter the incident ray 762 or ray 772, with near infrared filter 742, and focuses ray 762 or 772 onto sensor 746. Ray 762 or 772 are focused onto different locations on sensor 746. Ray 762 is a greater distance from the center of sensor 746 than ray 772 because second object 770 is of greater depth in the scene (for example, farther away from the receiver 740) than first object 760.

FIG. 8 illustrates the exemplary active sensing system of FIG. 7, with ray traces for two object locations for which original code positions cannot be uniquely identified with one receiver. Transmitter 730 projects the same codeword in ray 737 and ray 739. If a first object 780 is present, the first object 780 receives ray 737, which it reflects as ray 782. If a second object 790 is present, the second object 790 receives ray 739 which it reflects as ray 792.

Receiver 740 may filter the incident ray 782 or ray 792, with a near infrared filter 742, and focuses ray 782 or 792 onto sensor 746. Ray 782 or 792 are focused onto the same location on sensor 746, according to some embodiments. Accordingly, the original code position may not be able to be uniquely identified by using one receiver. Additional information may be needed to determine the original code position and to determine the depth of an object, for example, to distinguish between the location of the first object 780 and the second object 790. As a result, in this example, accurate depth cannot be determined with one receiver, because the codeword was repeated within the disparity range in ray 737 and 739, and reflected off of a objects 780 and 790.

FIG. 9 illustrates an exemplary active sensing system with one transmitter 730 and two receivers 740 and 750. FIG. 9 further illustrates ray traces for two objects 780 and 790, for which original code positions can be uniquely identified with the introduction of the second receiver 750. Transmitter 730 projects the same codeword in ray 737 and ray 739. If a first object 780 is present, the first object 780 receives ray 737, which it reflects as ray 782 and as ray 784. If a second object 790 is present, the second object 790 receives ray 739 which is reflects as ray 792 and as ray 794.

Receiver 740 may include near infrared filter 742a to filter the incident ray 782 or ray 792, and focuses ray 782 or 792 onto sensor 746. Ray 782 or 792 are focused onto the same location on sensor 746. Receiver 750 filters the incident ray 784 or ray 794, with a near infrared filter 752, and focuses ray 784 or 794 onto sensor 756. Ray 784 or 794 are focused onto different locations on sensor 756, with ray 784 a greater distance from the center of sensor 756 than ray 794 because the second object 790 is of greater depth than first object 780. As a result, depth can now be determined because the code positions may be uniquely identified with a system that includes the second receiver 750. With a two receiver configuration, it is possible to increase codeword reuse, including repeating codewords within the disparity range.

Where a codebook primitive is reused in a code mask, it is important to avoid detecting the same codeword from an adjacent codebook primitive (in the same code mask), also referred to as aliasing. For a single receiver 740, to prevent aliasing of codewords from adjacent codebook primitives, a codeword reuse distance (e.g., width w1 of codebook primitive 602 FIG. 6) should be greater than (or equal to) the maximum disparity (e.g., displacement distance w2) between the closest codeword instance 604 and farthest codeword instance 606 FIG. 6. With two receivers 740 and 750, the depth of an object in a scene (e.g., the distance the object is from the transmitter/receiver system) can be determined even when a codeword is repeated within the disparity range to produce the same codeword 737 and 739.

Figure 10:
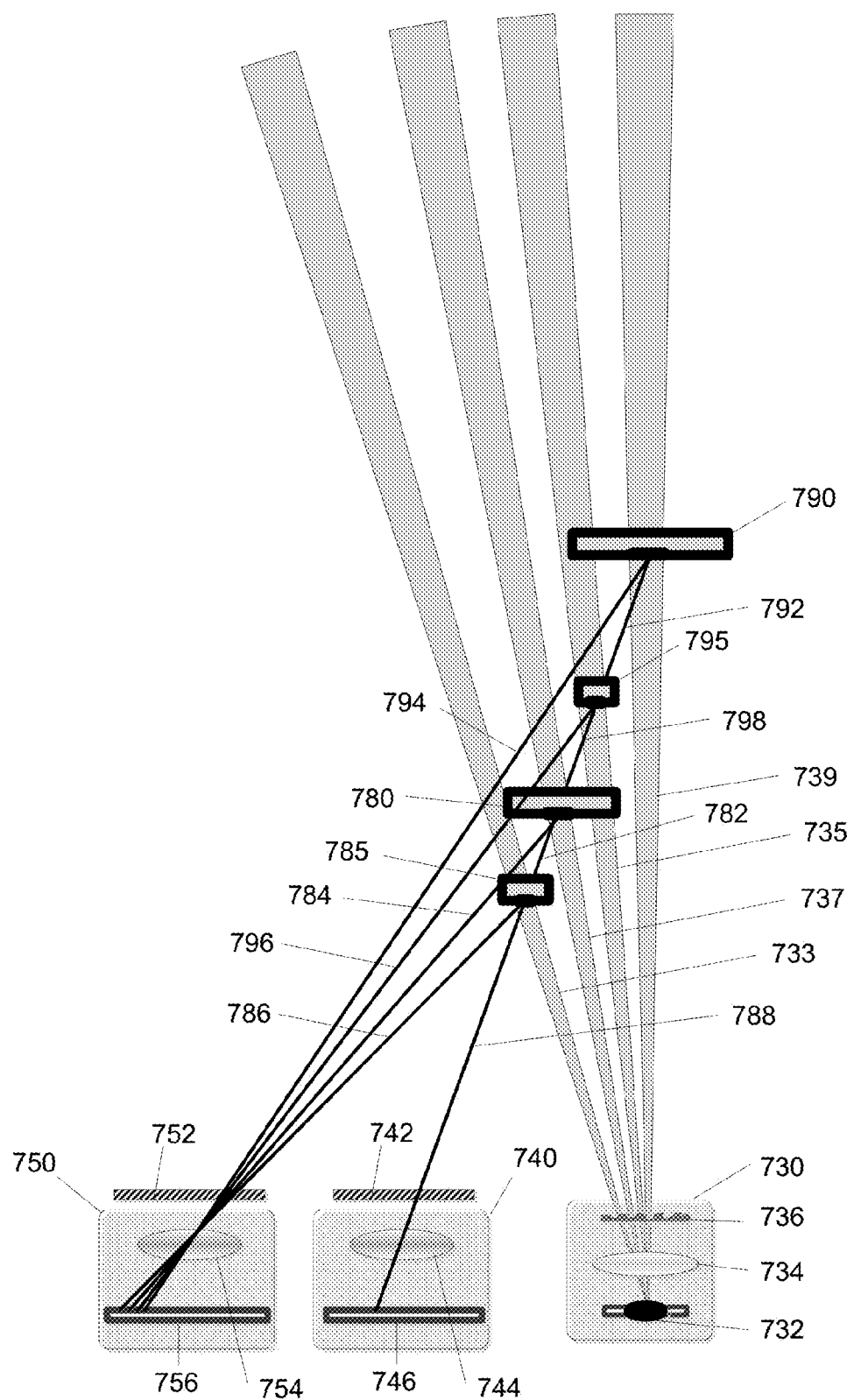
FIG. 10 illustrates an exemplary active sensing system with one transmitter and two receivers, with ray traces for four object locations including the two object locations of FIG. 8, for which original code positions can be uniquely identified with the introduction of the second receiver.

FIG. 10 illustrates an example of an embodiment of an active sensing system that includes one transmitter 730 and two receivers 740 and 750. Ray traces for four object locations 785, 780, 795 and 790 are illustrated. Object locations 780 and 790 represent the two object locations of FIG. 8, for which original code positions can be uniquely identified with the introduction of the second receiver. In FIG. 10, the same codeword is repeated within the disparity range at least four times. Four rays 733, 737, 735 and 739 represent a (the same) codeword projected by the transmitter 730 to four object locations 785, 780, 795 and 790, respectively. The two receivers 740 and 750 make it possible to uniquely identify which of the four positions in the codemask 736 corresponds to codewords received at sensor 746 of receiver 740 and sensor 756 of receiver 750. Transmitter 730 projects the same codeword in rays 733, 735, 737 and 739. Each projection of the codeword corresponds to a different location of the codeword on a codemask 736 that is in the transmitter 730.

In the embodiment illustrated in FIG. 10, if only first object 780 is present, the first object 780 receives ray 737, which it reflects as ray 782 and as ray 784. Receiver 740 filters the incident ray 782 with a near infrared filter 742, and lens 744 focuses ray 782 onto sensor 746. Receiver 750 filters the incident ray 784 with a near infrared filter 752, and lens 754 focuses ray 784 onto sensor 756.

If only second object 790 is present, the second object 790 receives ray 739 which it reflects as ray 792 and as ray 794. Receiver 740 filters the incident ray 792 with a near infrared filter 742, and focuses ray 792 onto sensor 746. Receiver 750 filters the incident ray 794 with a near infrared filter 752, and focuses ray 794 onto sensor 756.

If only third object 785 is present, the third object 785 receives ray 733 which it reflects as ray 788 and as ray 786. Receiver 740 filters the incident ray 788 with a near infrared filter 742, and focuses ray 788 onto sensor 746. Receiver 750 filters the incident ray 786 with a near infrared filter 752, and focuses ray 786 onto sensor 756.

If only fourth object 795 is present, the fourth object 795 receives ray 735 which it reflects as ray 798 and as ray 796. Receiver 740 filters the incident ray 798, with a near infrared filter 742, and focuses ray 798 onto sensor 746. Receiver 750 filters the incident ray 796, with a near infrared filter 752, and focuses ray 796 onto sensor 756.

If more than one of the four objects 780, 785, 790, and 795 are present, as illustrated in FIG. 10 then some of the rays illustrated may not be reflected to receiver 740 and/or receiver 750. For example, if object 785 and object 780 are present, then projected rays 782 and 784 would be blocked by object 785. Neither ray 782 nor ray 784 would reach a receiver.

Ray 782, 788, 792, or 798, are focused onto the same location on sensor 746. Therefore, the location of the codeword within mask 736 associated with this same location might be any one of four candidate locations on the codemask associated with projected rays 733, 735, 737, or 739. The introduction of a second receiver 750 makes it possible to determine which of the four candidate locations corresponds to an object, since rays 786, 784, 796, and 794 are focused onto different locations on sensor 756. Ray 784 is a greater distance from the center of sensor 756 than ray 794 because fourth object 790 is of greater depth than third object 780. Similarly, the four rays 786, 784, 796, and 794 are in successively shorter distances from the center of sensor 756, corresponding to the distance of first, second third and fourth objects 780, 790, 785, and 795, respectively. As a result, there is a one-to-one correspondence between the location of the reflected ray on sensor 756, and the projected codeword locations. The codeword location may be used to determine the depth of the object. With two receivers, it is therefore possible to reuse codewords within the disparity range.

In some embodiments, a set of candidate locations of the codewords in codemask 736 is determined for the image captured by sensor 756. Then the image captured by sensor 746 is used to select the candidate location corresponding to the codeword location for the image captured by sensor 756.

In some embodiments, a first set of candidate locations of the codeword in codemask 736 is determined for sensor 746, and a second set of candidate locations of the codeword in codemask 736 is determined for sensor 756. Then, the two sets of candidate locations are compared. If there is a location in common, then that location is selected. In some embodiments, the location is in common if they occur at the same pixel location. In some embodiments, the location is in common if the difference in pixel locations is less than a threshold (for example, of 2 pixels, or of 4 pixels).

In some embodiments, a first set of candidate locations of the codeword in codemask 736 is determined for sensor 746, and a second set of candidate locations of the codeword in codemask 736 is determined for sensor 756. Then, candidate depths are determined for location in the first set of candidate locations and the second set of candidate locations. Then, the two sets of candidate depths are compared. If there is a depth in common, then that depth is selected. In some embodiments, the depth is in common if they are equal. In some embodiments, the depth is in common if the difference in depth is less than a depth threshold.

Figure 11:
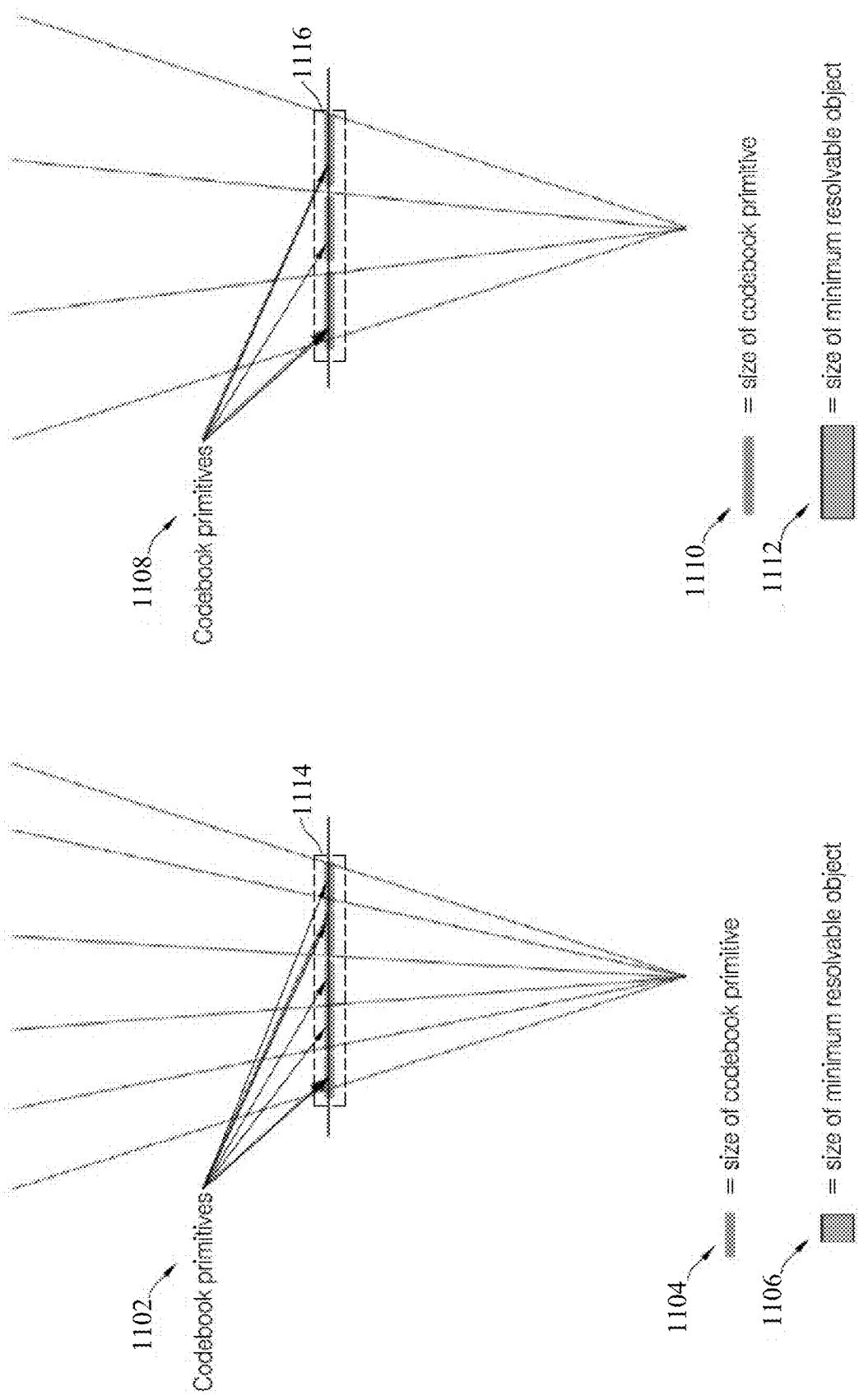
FIG. 11 illustrates the relationship between reuse distance of a codebook primitive and an object size.

FIG. 11 illustrates the relationship between reuse distance of a codebook primitive and an object size. According to two examples, a first codebook primitive 1102 is reused five times in a first code mask 1114 and a second codebook primitive 1108 is reused three times in a second code mask 1116. For a fixed number of horizontal codewords in a codebook primitive, increasing the reuse distance (e.g., width of the codebook primitive) reduces the minimum resolvable object size. For instance, for the first code mask 1114, the codebook primitive 1102 has a first size 1104 and the minimum resolvable object has a second size 1106, where the first size is more than the second size. By contrast, for the second code mask 1116, the second codebook primitive 1108 has a third size 1110 and the minimum resolvable object has a fourth size 1112, where the third size is less than the fourth size.

Figure 12:
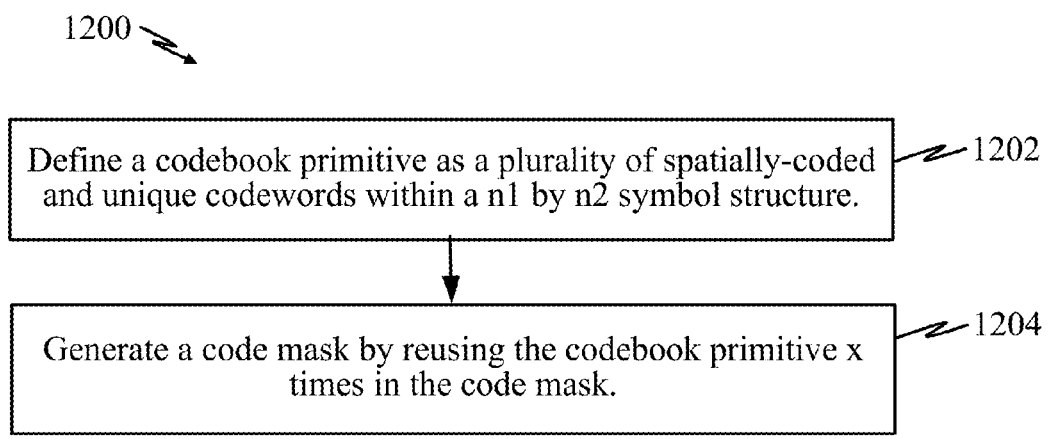
FIG. 12 is a flowchart illustrating an exemplary method for constructing a code mask by reusing a codebook primitive.

FIG. 12 is a flowchart illustrating an exemplary method 1200 for constructing a code mask by reusing a codebook primitive. At block 1202, the method 1200 defines a codebook primitive as a plurality of spatially-coded and unique codewords within an n1 by n2 symbol structure. At block 1204, the method 1200 generates a code by reusing the codebook primitive x times in the code mask.

The size of the codebook primitive may be a function of the minimum resolvable object size on which the code mask is to be projected. That is, for particular minimum and/or maximum ranges to which the code mask is to be projected, the size of the codebook primitive may be selected to achieve a certain resolution (e.g., minimum resolvable object size) at those ranges. For instance, the more times the codebook primitive is reused in the code mask, the smaller the minimum resolvable object size may be when the code mask is projected. Consequently, the size of the codebook primitive may be a function of the distance range to which the code mask is to be projected onto a scene or object. In one example, the smaller the codebook primitive, the smaller the minimum resolvable object size becomes when the code mask is projected. In another example, the smaller the codeword size, the smaller the minimum resolvable object size is when the code mask is projected. According to one implementation, the codeword size for all codewords may be the same (e.g., codewords may have the same width). In one example, the size of the codebook primitive may refer to one of either a width or a length of the codebook primitive.

Each spatially-coded and unique codeword may be a combination of m symbols. The plurality of spatially-coded and unique codewords in the codebook primitive may be a subset of all possible combinations of the m symbols within the n1 by n2 symbol structure.

In one example, the plurality of codewords may be defined from different overlapping k1 by k2 windows within the symbol structure. The windows defining the plurality of codewords may be co-linear and spatially overlapping.

The distance between repeated instances of a first codeword in the code mask may be greater than a maximum expected displacement for the first codeword when the code mask is projected onto an object and such projection is perceived by a receiver device (e.g., see FIG. 6).

The receiver device may be co-planar with a transmitter device that projects the code mask. The distance between repeated instances of a first codeword may be the same as a width of the codebook primitive.

In one example, a width of the codebook primitive is greater than a maximum expected displacement for the first codeword when the code mask is projected onto an object and such projection is perceived by a receiver device. The receiver device is co-planar with a transmitter device that projects the code mask.

The code mask may facilitate obtaining depth information for a surface portion of an object onto which the code mask is projected. The codebook primitive may be tessellated x times (e.g., illustrated in FIG. 11) to cover a desired field of view onto which the codebook is to be projected. That is, the codebook primitive may be replicated or repeated, e.g., in one or more directions/dimensions, to construct a larger code mask. In one example, x may be an integer value equal to or greater than zero. That is, depending on the minimum object resolution sought, the size of the codeword primitive and/or code mask may be adjusted (e.g., the larger the codeword primitive and/or code mask the higher resolution attainable).

Figure 13:
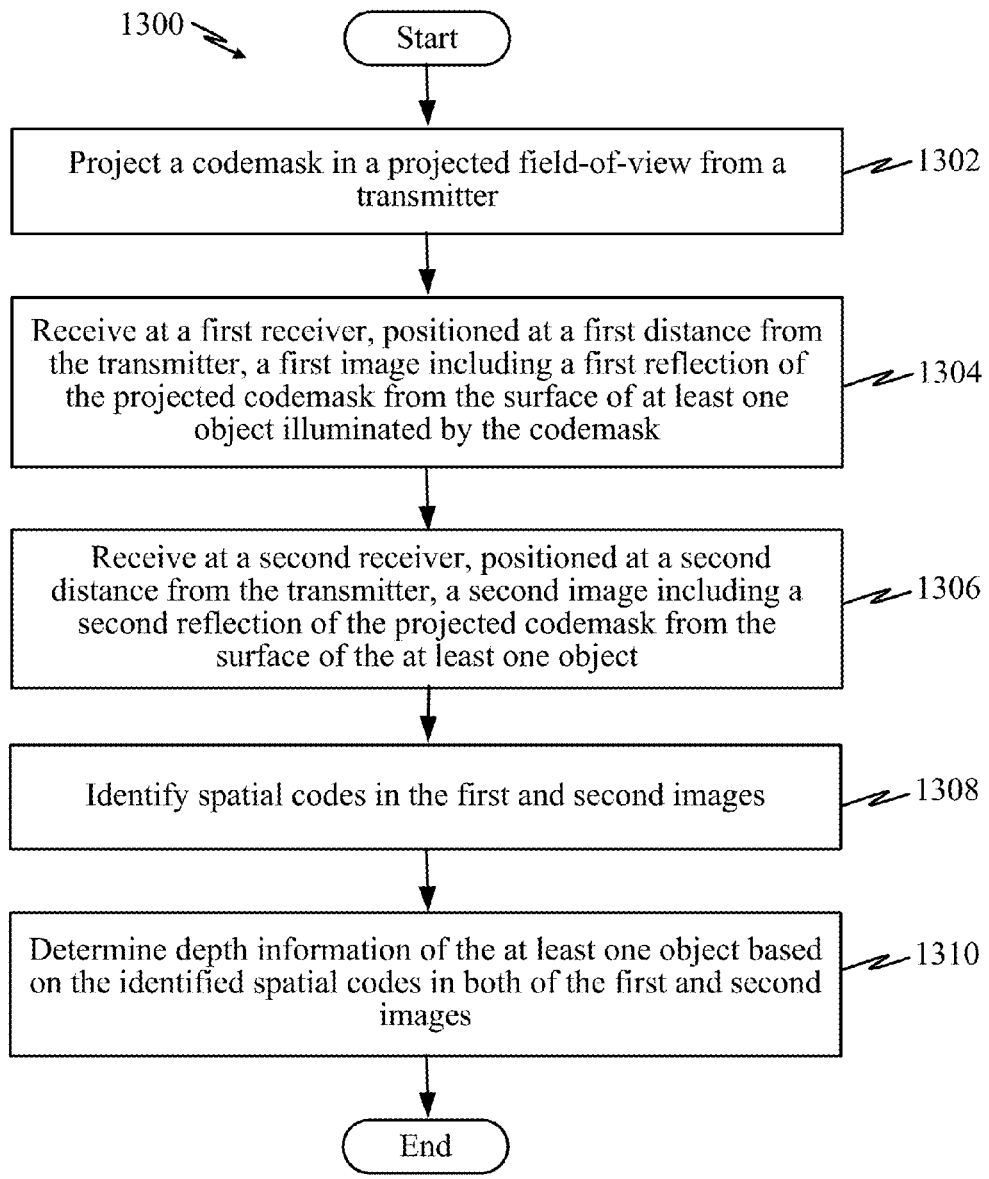
FIG. 13 is a flowchart that illustrates an example of a method of generating depth information of an object in a scene.

FIG. 13 is a flowchart that illustrates an example of a method 1300 of generating depth information of an object in a scene. At block 1302, the process 1300 projects a codemask in a projected field-of-view from a transmitter. In some implementations, the functionality of block 1302 may be performed by the transmitter 730 illustrated in FIG. 10. At block 1304, the process 1300 receives at a first receiver, positioned at a first distance from the transmitter, a first image including a first reflection of the projected codemask from the surface of at least one object illuminated by the codemask. In some implementations, the functionality of block 1304 may be performed by the receiver 740 illustrated in FIG. 10. At block 1306, the process 1300 receives at a second receiver, positioned at a second distance from the transmitter, a second image including a second reflection of the projected codemask from the surface of the at least one object. In some implementations, the functionality of block 1306 may be performed by the receiver 750 illustrated in FIG. 10. At block 1308, the process 1300 identifies spatial codes in the first and second images. In some implementations, the functionality of block 1308 may be performed by the receiver 740 and/or the receiver 750 illustrated in FIG. 10. At block 1310, the process 1300 determines depth information of the at least one object based on the identified spatial codes in both of the first and second images. In some implementations, the functionality of block 1310 may be performed by the receiver 740 and/or receiver 750 illustrated in FIG. 10.

Figure 14:
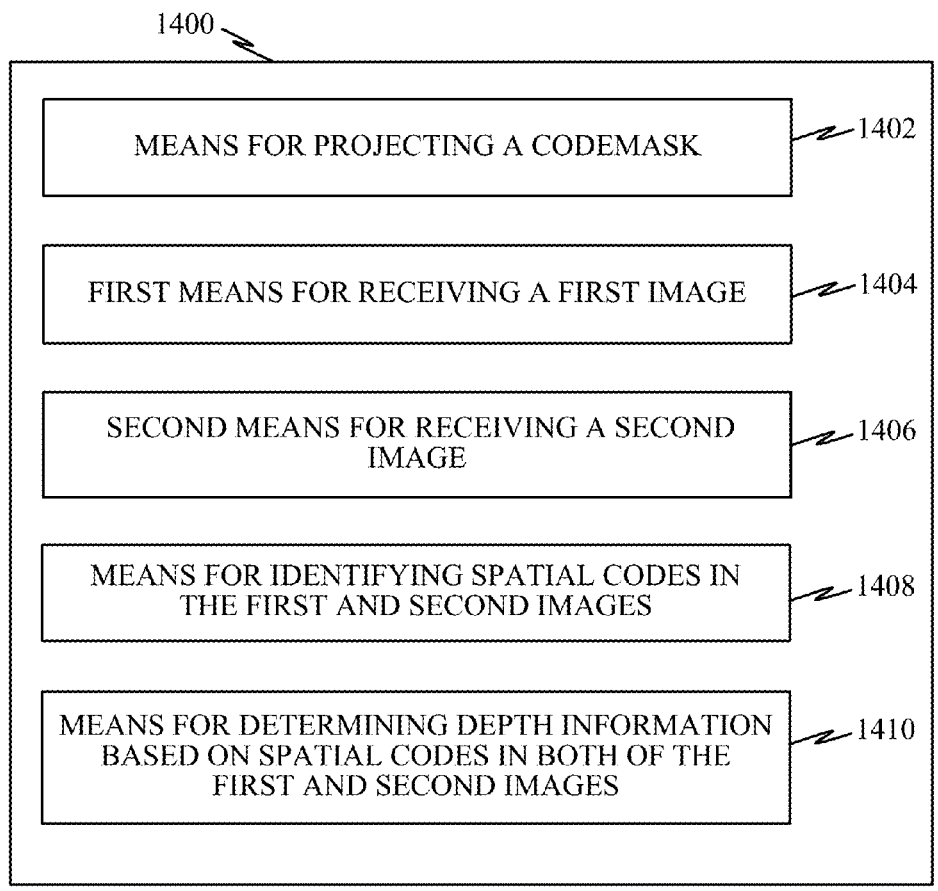
FIG. 14 is a block diagram illustrating an example of an apparatus for generating depth map information for at least one object in a scene.

FIG. 14 is a block diagram illustrating an example of an apparatus 1400 for generating depth map information for at least one object in a scene. The apparatus 1400 may include means 1402 for projecting a codemask in a projected field-of-view from the projecting means 1402. In some implementations, the projecting means 1402 may be a transmitter 730. The apparatus 1400 may include a first means 1404 for receiving, positioned at a first distance from the transmitter, a first image including a first reflection of the projected codemask from the surface of at least one object illuminated by the codemask. In some implementations, the first distance receiving means 1404 may be a receiver 740 illustrated in FIG. 10. The apparatus 1400 may include means 1406 for receiving, positioned at a second distance from the transmitter, a second image including a second reflection of the projected codemask from the surface of the at least one object. In some implementations, the second distance receiving means 1406 may be a receiver 750 illustrated in FIG. 10. The apparatus 1400 may include means 1408 for identifying spatial codes in the first and second images. In some implementations, identifying spatial means 1408 may be a receiver 740 and/or the receiver 750 illustrated in FIG. 10. The apparatus 1400 may include means 1410 for determining depth information of the at least one object based on the identified spatial codes in both of the first and second images. In some implementations, the determining means 1410 may be a receiver 740 and/or the receiver 750 illustrated in FIG. 10.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An imaging apparatus for generating depth information for at least one object in a scene, comprising:
    a transmitter configured to project a codemask onto an object in a scene, the codemask including at least two sets of codewords that are unique within each set, and at least two of the sets of codewords each including at least some of the same codewords as another set;
    a first receiver positioned at a first distance from the transmitter, the first receiver configured to capture a first image that includes codewords that are reflected from the object that is illuminated by the projected codemask;
    a second receiver positioned at a second distance from the transmitter, the second receiver configured to capture a second image that includes codewords that are reflected from the object that is illuminated by the projected codemask; and
    at least one processor in communication with the first receiver and the second receiver, the at least one processor configured to obtain the first image, obtain the second image, match a first codeword that exists in the first image and in the second image to codewords in the codemask, and determine depth information of the object based on the matched codewords.

2. The imaging apparatus of claim 1, wherein at least two of the sets of codewords are identical.

3. The imaging apparatus of claim 1,
    wherein the at least one processor is further configured to
        match the first codeword to a set of codewords in the codemask, each codeword in the set being associated with a location in the codemask and the first codeword being associated with a location in the first image and a location in the second image;
        determine a first difference between the location in the codemask of the first codewords and the location of the first codewords in the first image, and determine a second difference between the location in the codemask of the first codewords and the location of the first codewords in the second image, the first difference and the second difference each corresponding to a depth of the object; and
        determine depth information of the object based on the first and second differences.

4. The imaging apparatus of claim 1,
    wherein the at least one processor is further configured to
        identify a first set of candidate codemask locations in the projected codemask corresponding to one of the identified codewords in the first image;
        identify a second set of candidate codemask locations in the projected codemask corresponding to one of the identified codewords in the first image;
        select a codemask location based on the first and second sets of candidate codemask locations;
        determine a difference between the codemask location and the location of one of the identified codewords in the first image or the second image;
        determine depth information of the at least one object based on the difference in location.

5. The imaging apparatus of claim 4, wherein the selected codemask location is within a distance tolerance of a candidate codemask location in the first set and within the distance tolerance of a candidate codemask location in the second set.

6. The imaging apparatus of claim 1, wherein the at least one processor is further configured to
    determine a first set of differences in the location of a plurality of codewords in the projected codemask and the location of said plurality of codewords in the first image
    determine a second set of differences in the location of a plurality of codewords in the projected codemask and the location of said plurality of codewords in the second image; and
    determine depth information of the at least one object based on the determined first and second sets of differences of the plurality of codewords.

7. The imaging apparatus of claim 1, wherein the second sensor is positioned closer to the first sensor than to the transmitter.

8. The imaging apparatus of claim 1, wherein the first sensor is between the second sensor and the transmitter.

9. The imaging apparatus of claim 1, wherein the first distance and the second distance are different.

10. The imaging apparatus of claim 1, wherein the at least one processor is further configured to obtain the codemask.

11. A method for generating a depth map, the method comprising:

projecting a codemask in a projected field-of-view from a transmitter onto an object in a scene, the codemask including at least two sets of codewords that are unique within each set, and at least two of the sets of codewords each including a portion of the same codewords as the another set;

receiving at a first receiver, positioned at a first distance from the transmitter, a first image including a first reflection of the projected codemask from the surface of the one object;

receiving at a second receiver, positioned at a second distance from the transmitter, a second image including a second reflection of the projected codemask from the surface of the one object;

identifying codewords in the first and second images; and determining depth information of the at least one object based on the identified codewords in both of the first and second images.

12. The method of claim 11, wherein at least two of the sets of codewords are identical.

13. The method of claim 11, the method further comprising:
identifying a set of candidate codemask locations in the projected codemask corresponding to one of the identified codewords in the first image;
selecting a codemask location from the set of candidate codemask locations, the selected codemask location corresponding to the one of the identified codewords in the second image;
determining a difference in location between the codemask location and the location of the one of identified codewords in the first image or the second image; and
determining depth information of the at least one object based on the difference in location.

14. The method of claim 11, the method further comprising:
identifying a first set of candidate codemask locations in the projected codemask corresponding to one of the identified codewords in the first image;
identifying a second set of candidate codemask locations in the projected codemask corresponding to one of the identified codewords in the first image;
selecting a codemask location based on the first and second sets of candidate codemask locations;
determining a difference in location between the codemask location and the location of the one of identified codewords in the first image or the second image; and
determining depth information of the at least one object based on the difference in location.

15. The method of claim 14, wherein the selected codemask location is within a distance tolerance of a candidate codemask location in the first set and within the distance tolerance of a candidate codemask location in the second set.

16. The method of claim 11, the method further comprising:
determining a first set of differences in the location of a plurality of codewords in the projected codemask and the location of said plurality of codewords in the first image;
determining a second set of differences in the location of a plurality of codewords in the projected codemask and the location of said plurality of codewords in the second image; and
determining depth information of the at least one object based on the said determined first and second sets of differences of the plurality of codewords.

17. The method of claim 11, wherein the second sensor is positioned closer to the first sensor than to the transmitter.

18. The method of claim 11, wherein the first sensor is between the second sensor and the transmitter.

19. The method of claim 11, wherein the first distance and the second distance are different.

20. The method of claim 11, wherein the at least one processor is further configured to obtain the codemask.

21. An apparatus for generating depth map information for at least one object in a scene, comprising:
means for projecting a codemask having at least two sets of codewords that are unique within each set, and at least two sets of the sets of codewords contain at least a portion of the same codewords;
a first means for receiving a first image including a first reflection of the projected codemask from the surface of at least one object illuminated by the projected codemask, the first means for receiving positioned at a first distance from the means for projecting;
a second means for receiving a second image including a second reflection of the projected codemask from the surface of the at least one object illuminated by the projected codemask, the second means for receiving positioned at a second distance from the means for projecting;
means for identifying codewords that are in both of the first image and the second image, and
means for determining depth information of the at least one object based on the identified codewords.

22. The apparatus of claim 21, wherein the means for projecting comprises a transmitter, wherein the first means for receiving comprises a first receiver, wherein the second means for receiving comprises a second receiver, wherein the means for identifying comprises at least one processor, and wherein the means for determining comprises at least one processor.

23. The apparatus of claim 21, the apparatus further comprising:
means for identifying a set of candidate codemask locations in the projected codemask corresponding to one of the identified codewords in the first image;
means for selecting a codemask location from the set of candidate codemask locations, the selected codemask location corresponding to the one of the identified codewords in the second image;
means for determining a difference in location between the codemask location and the location of the one of identified codewords in the first image or the second image; and
means for determining depth information of the at least one object based on the difference in location.

24. The apparatus of claim 21, the apparatus further comprising:
means for identifying a first set of candidate codemask locations in the projected codemask corresponding to one of the identified codewords in the first image;
means for identifying a second set of candidate codemask locations in the projected codemask corresponding to one of the identified codewords in the first image;
means for selecting a codemask location based on the first and second sets of candidate codemask locations;
means for determining a difference in location between the codemask location and the location of the one of identified codewords in the first image or the second image; and
means for determining depth information of the at least one object based on the difference in location.

25. The apparatus of claim 23, wherein the selected codemask location is within a distance tolerance of a candidate codemask location in the first set and within the distance tolerance of a candidate codemask location in the second set.

26. The apparatus of claim 23, the apparatus further comprising:
   means for determining a first set of differences in the location of a plurality of codewords in the projected codemask and the location of said plurality of codewords in the first image;
   means for determining a second set of differences in the location of a plurality of codewords in the projected codemask and the location of said plurality of codewords in the second image; and
   means for determining depth information of the at least one object based on the said determined first and second sets of differences of the plurality of codewords.

27. A non-transitory computer-readable medium storing instructions for generating depth information, the instructions when executed perform a process comprising:
   projecting a codemask in a projected field-of-view from a transmitter, the codemask having at least two sets of codewords that are unique within each set, and at least two of the sets of codewords codes contain at least a portion of the same codewords as another set;
   capturing, by a first receiver, a first image of at least one object illuminated by the projected codemask, the first receiver positioned at a first distance from the transmitter;
   capturing, by a second receiver, a second image of the at least one object illuminated by the projected codemask, the second receiver positioned at a second distance from the transmitter, the first and second images depicting at least a portion of the projected codemask that is reflected from a surface of the at least one object;
   identifying codewords in the first image and the second image, and
   determining depth information of the at least one object based on the identified codewords that are in both the first and second images.

28. The non-transitory computer-readable medium of claim 27, the process further comprising:
   identifying a set of candidate codemask locations in the projected codemask corresponding to one of the identified codewords in the first image;
   selecting a codemask location from the set of candidate codemask locations, the selected codemask location corresponding to the one of the identified codewords in the second image;
   determining a difference in location between the selected codemask location and the location of the one of the identified codewords in the first image or the second image; and
   determining depth information of the at least one object based on the difference in location.

* * * * *